United States Patent
Okano et al.

(10) Patent No.: US 9,475,492 B2
(45) Date of Patent: Oct. 25, 2016

(54) PARKING ASSIST DEVICE

(71) Applicant: Panasonic Intellectual Property Management Co., Ltd., Osaka (JP)

(72) Inventors: Kenji Okano, Aichi (JP); Hirotaka Kamiyama, Kanagawa (JP)

(73) Assignee: PANASONIC INTELLECTUAL PROPERTY MANAGEMENT CO, LTD., Osaka (JP)

( * ) Notice: Subject to any disclaimer, the term of this patent is extended or adjusted under 35 U.S.C. 154(b) by 0 days.

(21) Appl. No.: 14/439,574

(22) PCT Filed: Nov. 1, 2013

(86) PCT No.: PCT/JP2013/006500
§ 371 (c)(1),
(2) Date: Apr. 29, 2015

(87) PCT Pub. No.: WO2014/073193
PCT Pub. Date: May 15, 2014

(65) Prior Publication Data
US 2015/0258989 A1 Sep. 17, 2015

(30) Foreign Application Priority Data

Nov. 6, 2012 (JP) ................................. 2012-244164
Feb. 6, 2013 (JP) ................................. 2013-021079

(51) Int. Cl.
*G05D 1/00* (2006.01)
*G05D 3/00* (2006.01)
(Continued)

(52) U.S. Cl.
CPC ............ *B60W 30/06* (2013.01); *B60W 40/105* (2013.01); *G06K 9/00791* (2013.01); *G06T 7/004* (2013.01); *G08G 1/168* (2013.01); *H04N 7/18* (2013.01); *G06T 2207/30264* (2013.01)

(58) Field of Classification Search
CPC . H04N 7/18; G06K 9/00791; B60W 40/105; B60W 30/06; G08G 1/168; G06T 7/004

USPC ............................................................ 701/1
See application file for complete search history.

(56) References Cited

U.S. PATENT DOCUMENTS

2003/0150661 A1* 8/2003 Kataoka ................. B60Q 9/004
                                                                180/204
2006/0139181 A1   6/2006 Danz et al.
(Continued)

FOREIGN PATENT DOCUMENTS

JP    08-048198 A    2/1996
JP    10-114723 A    5/1998
(Continued)

OTHER PUBLICATIONS

International Search Report for Application No. PCT/JP2013/006500 dated Feb. 10, 2014.

*Primary Examiner* — Maceeh Anwari
(74) *Attorney, Agent, or Firm* — Pearne & Gordon LLP

(57) ABSTRACT

Provided is a parking assist device such that, when a vehicle has reached an area corresponding to a backing start position, the angle of a current position with respect to a target parking position is placed in an appropriate range so as to facilitate subsequent guidance to the target parking position. In the parking assist device, when a vehicle (601) has reached any of a plurality of backing start positions (603 to 605), a state control unit (112) determines whether the angle of a current position with respect to a target parking position (602) is appropriate for guidance to a target parking position (602), and, if not, displays an angle correction indicating icon (606) on an image display means (102) to provide an indication for correcting the angle.

11 Claims, 24 Drawing Sheets

(51) Int. Cl.
  *G06F 7/00* (2006.01)
  *G06F 17/00* (2006.01)
  *B60W 30/06* (2006.01)
  *H04N 7/18* (2006.01)
  *G06K 9/00* (2006.01)
  *G06T 7/00* (2006.01)
  *G08G 1/16* (2006.01)
  *B60W 40/105* (2012.01)

(56) References Cited

U.S. PATENT DOCUMENTS

| | | |
|---|---|---|
| 2010/0106372 A1 | 4/2010 | Watanabe et al. |
| 2010/0118140 A1 | 5/2010 | Iwakiri et al. |
| 2010/0194596 A1* | 8/2010 | Wang ................ B60R 1/00 340/936 |
| 2010/0228426 A1 | 9/2010 | Suzuki et al. |

FOREIGN PATENT DOCUMENTS

| | | |
|---|---|---|
| JP | 2001-018821 A | 1/2001 |
| JP | 2003-205809 A | 7/2003 |
| JP | 2006-509671 A | 3/2006 |
| JP | 2006-312439 A | 11/2006 |
| JP | 2007-180622 A | 7/2007 |
| JP | 2008-201178 A | 9/2008 |
| JP | 2008-265439 A | 11/2008 |
| JP | 2009-083735 A | 4/2009 |
| JP | 2010-183170 A | 8/2010 |
| JP | 2012-066709 A | 4/2012 |

* cited by examiner

PARKING ASSIST DEVICE

TECHNICAL FIELD

The present invention relates to a parking assistance apparatus that provides parking assistance during parking, especially parallel parking or double parking.

BACKGROUND ART

Conventionally, parking assistance apparatuses have been known, which detect a target parking position or moving state of a vehicle using a sensor such as sonar, calculate route guidance or a rearward-movement start position and perform automatic steering for the purpose for alleviating the driving load of drivers during parking (e.g., see Patent Literature (hereinafter, referred to as "PTL") 1). In addition, there have been known parking assistance apparatuses which present a rearward-movement start position in a plurality of regions, guide a driver within these regions and thereby provide convenience for the driver in driving operation according to the surrounding situation (e.g., see PTL 2).

CITATION LIST

Patent Literature

PTL 1
Japanese Unexamined Patent Application Publication (Translation of PCT Application) No. 2006-509671
PTL 2
Japanese Patent Application Laid-Open No. 2012-066709

SUMMARY OF INVENTION

Technical Problem

However, although the conventional parking assistance apparatuses can guide their assistance target vehicles (hereinafter, referred to as "host vehicles") to one of a plurality of rearward-movement start positions, the conventional apparatuses involve the following problem: in a case where an angle of the current position with respect to a target parking position is not within an appropriate range, subsequent guidance to target parking positions becomes difficult even when the current position is within the region of the rearward-movement start position.

An object of the present invention is to provide a parking assistance apparatus that adjusts, when its host vehicle reaches a region corresponding to a rearward-movement start position, an angle of the current position with respect to a target parking position within an appropriate range and facilitates subsequent guidance to the target parking position.

Solution to Problem

In order to achieve the above described object, the present invention has a feature that a determining section determines, when a host vehicle reaches one of a plurality of rearward-movement start positions, whether or not an angle of a current position with respect to a target parking position is appropriate, and if not, issues an instruction to correct the angle.

Advantageous Effects of Invention

The present invention provides an effect of being able to reduce a driver's driving burden of moving the driver's host vehicle to a rearward-movement start position and facilitate guidance of the host vehicle from the rearward-movement start position to a target parking position.

DESCRIPTION OF EMBODIMENTS

Hereinafter, embodiments of the present invention will be described in detail with reference to the accompanying drawings.

(Embodiment 1)

Figure 1:
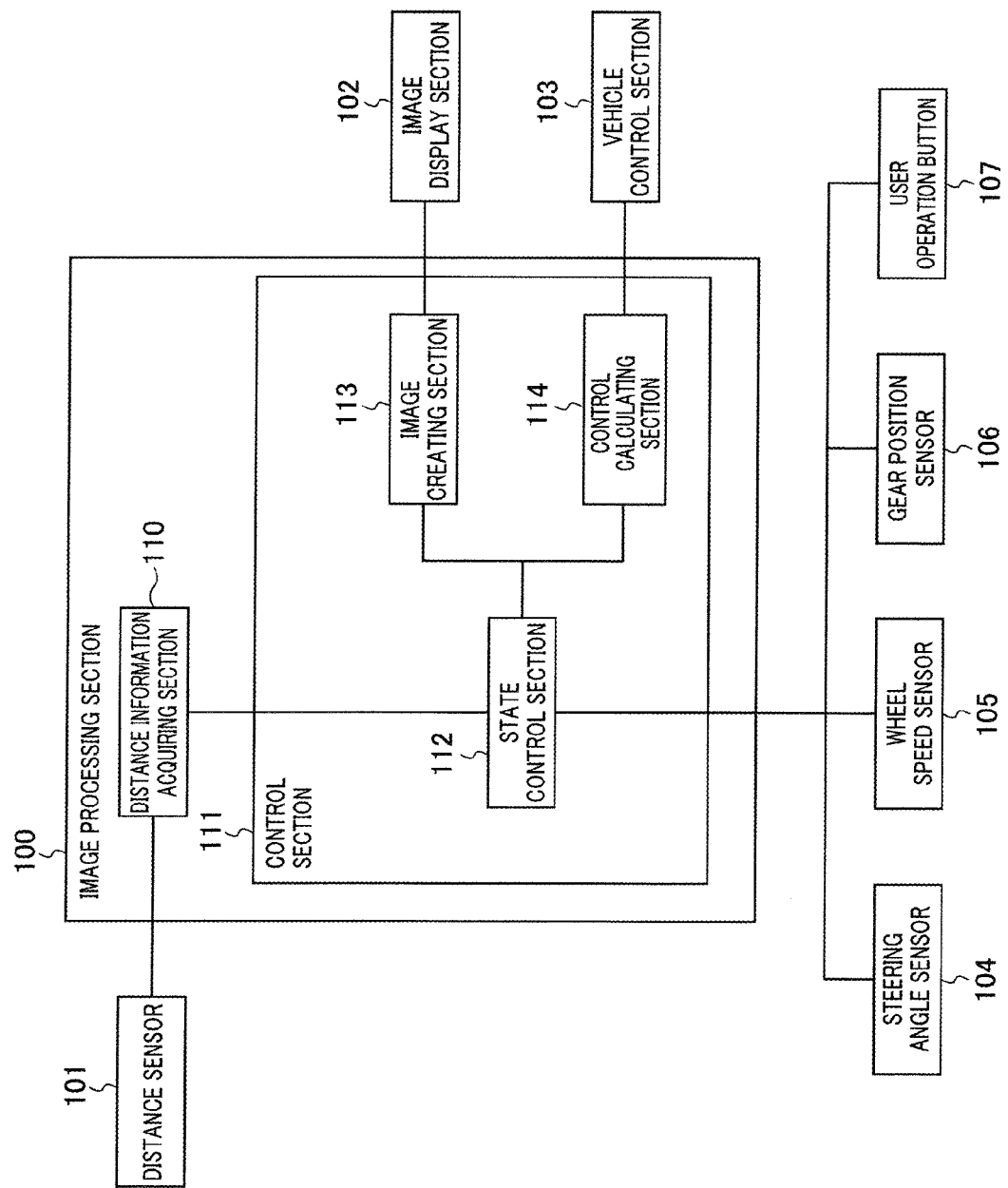
FIG. 1 is a block diagram illustrating a configuration of a parking assistance apparatus according to Embodiment 1 of the present invention.

FIG. 1 is a block diagram illustrating a configuration of a parking assistance apparatus according to Embodiment 1 of the present invention.

In FIG. 1, the parking assistance apparatus includes image processing section 100, which is connected to distance sensor 101, image display section 102, vehicle control section 103, steering angle sensor 104, wheel speed sensor 105, gear position sensor 106 and user operation button 107 to acquire respective input signals. Distance sensor 101, image display section 102, vehicle control section 103, steering angle sensor 104, wheel speed sensor 105, gear position sensor 106 and user operation button 107 may also be included in the parking assistance apparatus.

Distance sensor 101 is made up of a device such as an ultrasound sensor and attached to a body side face, preferably a front bumper side of a vehicle. Distance sensor 101 measures a distance between the host vehicle and an object located in the lateral direction of the vehicle based on a reflected wave acquired from the object in the lateral direction of the vehicle.

Image display section 102 is made up of, for example, a display of a navigation apparatus. Image display section 102 may also be constructed of a display of a smartphone or PND (Portable Navigation Device) via radio communication such as short-distance radio communication. Image display section 102 is provided inside a vehicle visually recognizable from a driver's seat and displays a processed image outputted from image processing section 100.

Vehicle control section 103 is constructed of an actuator that drives the host vehicle and an electric power steering mechanism and controls the drive of the host vehicle based on an instruction from image processing section 100.

Steering angle sensor 104, wheel speed sensor 105, gear position sensor 106 and user operation button 107 output a steering angle signal indicating a steering turning angle, a vehicle speed signal indicating a vehicle speed of the host vehicle, a gear position state signal indicating a gear position state, and a signal indicating an instruction of parallel parking or double parking assistance to image processing section 100 as vehicle state signals via a CAN (Controller Area Network). User operation button 107 is constructed of, for example, a touch panel, remote controller, switch, and operation button. When constructed of a touch panel, user operation button 107 may be provided in image display section 102.

Image processing section 100 is constructed of, for example, a CPU, ASIC (Application Specific Integrated Circuit), DSP (Digital Signal Processor) or FPGA (Field Programmable Grid Array) and includes distance information acquiring section 110 and control section 111. Control section 111 includes state control section 112 that determines and controls the current state of the host vehicle, image creating section 113 that creates an image based on the current state of the host vehicle and control calculating section 114 that calculates information used for operation control on the host vehicle such as route calculation.

Distance information acquiring section 110 is constructed of a volatile memory such as a buffer memory. Distance information acquiring section 110 is connected to distance sensor 101 and temporarily stores distance information of an object located in the lateral direction of the vehicle inputted from distance sensor 101. The distance information stored in distance information acquiring section 110 is outputted to state control section 112.

State control section 112 is connected to distance information acquiring section 110, steering angle sensor 104, wheel speed sensor 105, gear position sensor 106 and user operation button 107 and performs various calculations based on the vehicle state signals inputted from the respective sections. For example, state control section 112 instructs image creating section 113 to perform image processing to assist parallel parking according to a parallel parking instruction from user operation button 107. State control section 112 performs various calculations such as detection of a target parking position, predicted trace of the host vehicle in the rearward direction, target parking position of parallel parking and current position of the host vehicle based on information on the distance from an object neighboring the vehicle, vehicle speed information of the host vehicle and steering angle information acquired from distance information acquiring section 110, wheel speed sensor 105 and steering angle sensor 104 respectively.

Figure 2:
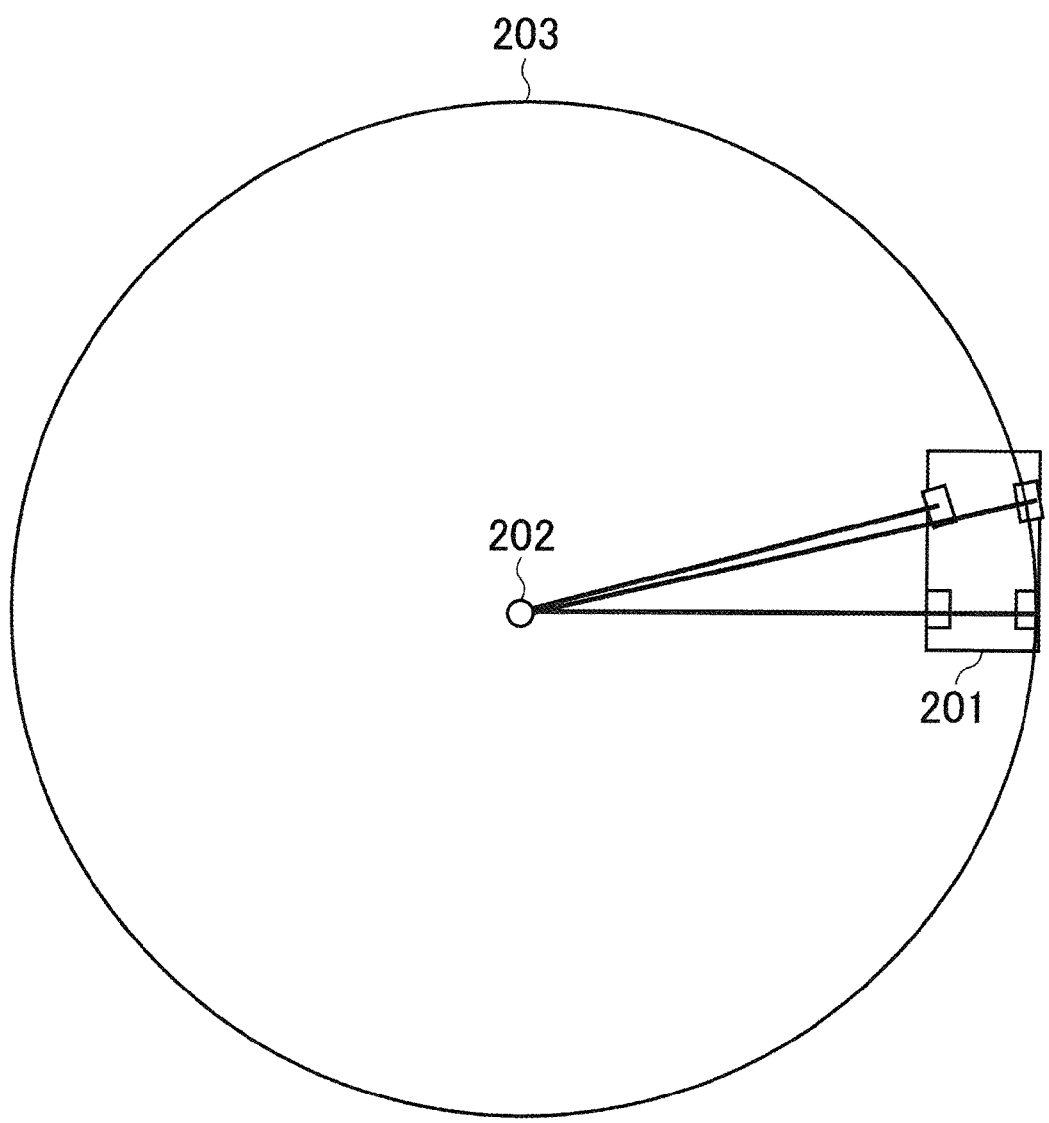
FIG. 2 illustrates an image of calculation of a host vehicle (hereinafter, referred to as "host vehicle") position by a state control section, which is a main part in FIG. 1.

A well-known Ackermann model is used to calculate a current position of the host vehicle. For example, as shown in FIG. 2, when a circular motion is performed with a predicted trace such as arc 203 by turning the steering wheel of host vehicle 201, steering angles of the front wheels are set so that extensions of the respective axles of the inner and outer wheels of the front wheels and an extension of the rear wheel axle always intersect with each other at center of rotation 202. Since low-speed turning is known to be similar to operation of an Ackermann model, state control section 112 can estimate the current position of the host vehicle from the parking start using steering angle information and vehicle speed information of the host vehicle based on this model.

Figure 3:
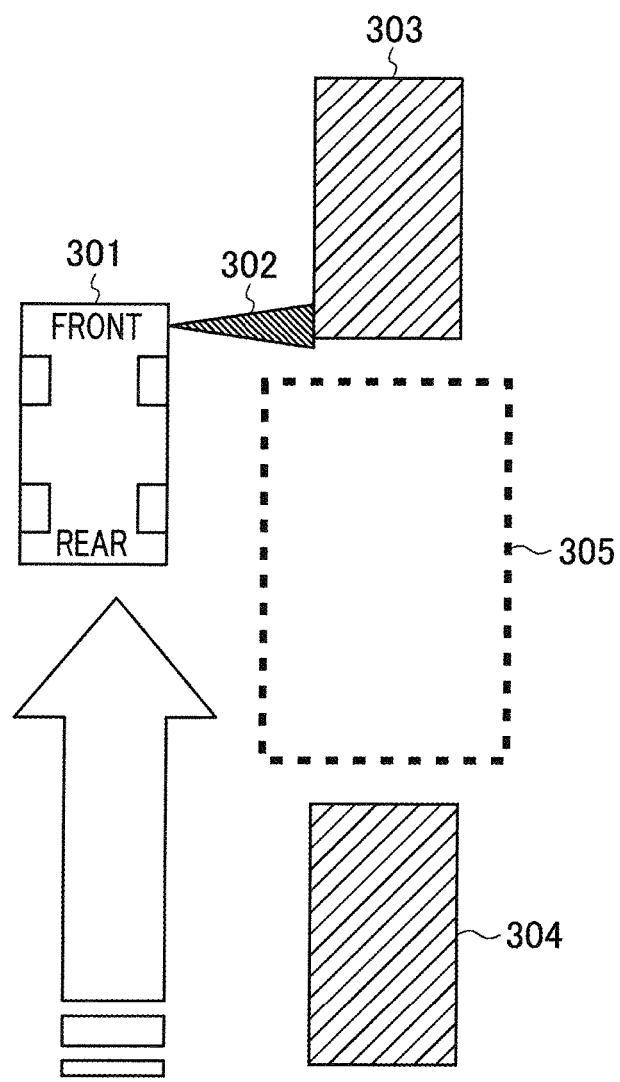
FIG. 3 illustrates an image of detection of a target parking position by the state control section, which is a main part in FIG. 1.

Next, detection of a target parking position by state control section 112 will be described using FIG. 3. As shown in FIG. 3, host vehicle 301 transmits ultrasound 302 from distance sensor 101 while running, detects reflected waves from parked vehicles 303 and 304 and thereby detects distances between host vehicle 301 and parked vehicles 303 and 304. When a state in which this distance is equal to or above a predetermined distance continues for a predetermined time or more, state control section 112 detects the space between parked vehicles 303 and 304 as target parking position 305. That is, state control section 112 can perceive the position and size of the space with reference to the current position of the host vehicle estimated as described above and the distance information acquired from distance information acquiring section 110 and determine a target parking position.

Figure 4:
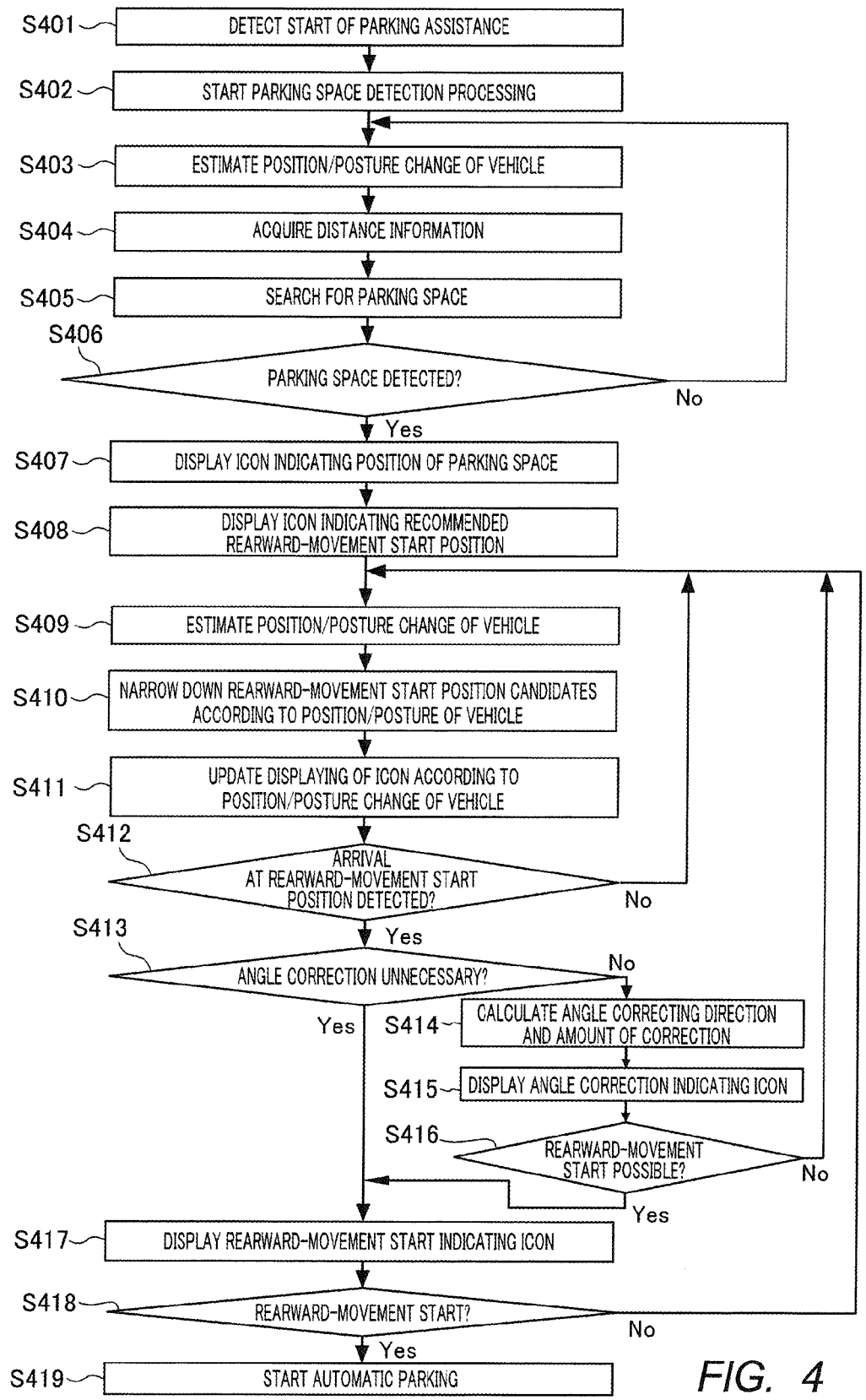
FIG. 4 is a flowchart illustrating processing by the parking assistance apparatus of the present invention.

Next, parking assistance processing by the parking assistance apparatus according to Embodiment 1 of the present invention will be described using a flowchart in FIG. 4.

First, in step S401, when the user presses user operation button 107 and inputs an instruction to start parking assistance, state control section 112 detects the start of parking assistance and state control section 112 starts parking space detection processing in step S402.

In step S403, state control section 112 estimates the current position and a posture change of the host vehicle with respect to the parking start position based on steering angle information acquired from steering angle sensor 104 and vehicle speed information acquired from wheel speed sensor 105. Note that the "posture" means an angle change of the host vehicle at the current position with respect to the host vehicle at the parking start position.

In step S404, state control section 112 acquires distance information from distance sensor 101 via distance information acquiring section 110, and in step S405, state control section 112 searches for a parking space.

In step S406, state control section 112 determines whether or not a parking space is detected. When the result shows "No" in step S406, the process in step S403 is performed again. On the other hand, when the result shows "Yes" in step S406, image display section 102 displays an icon indicating the position of the parking space created by image creating section 113 in step S407.

In step S408, image display section 102 displays a plurality of regions corresponding to the recommended rearward-movement start positions created by image creating section 113 using icons. More specifically, these icons are made up of three icons indicating a first region where parking is possible without steering wheel turning back, a second region where parking is possible with or without steering wheel turning back and a third region where parking is possible by turning the steering wheel back. According to this icon display, the user can move the host vehicle forward to the rearward-movement start position.

In step S409, when the host vehicle is moving forward, state control section 112 estimates the position and posture change of the host vehicle similar to those in step S403 as appropriate, and in step S410, state control section 112 narrows down rearward-movement start position candidates based on the information on the position and the posture of the host vehicle estimated in step S409. More specifically, state control section 112 excludes, from candidates, a region determined to be unreachable by the host vehicle at a maximum turning angle. Here, the determination to be unreachable by the host vehicle may be made, for example, when the entire host vehicle cannot enter the region or when the center of the rear wheel axle cannot enter the region.

In step S411, image display section 102 displays an icon image updated by image creating section 113 according to the position and posture change of the host vehicle. More specifically, image display section 102 displays only icons indicating regions reachable by the host vehicle except the icons indicating the regions excluded in step S410.

In step S412, state control section 112 determines whether or not the host vehicle has reached the rearward-movement start position based on the information on the current position and posture of the host vehicle calculated as appropriate and information on the recommended rearward-movement start position. When the result is "No" in step S412, the process in step S409 is performed again. On the other hand, when the result is "Yes" in step S412, the flow proceeds to step S413.

In step S413, state control section 112 determines whether or not an angle of approach at the current position with respect to the target parking position is appropriate, that is, whether or not angle correction of the host vehicle is unnecessary. When the result is "No" in step S413, state control section 112 calculates an angle correcting direction and correction amount of the host vehicle in step S414.

In step S415, image display section 102 displays an icon indicating the angle correction created by image creating section 113 and in step S416, state control section 112 determines whether or not a rearward-movement start is enabled. When the result is "No" in step S416, that is, when state control section 112 determines that the host vehicle still cannot be parked at the target parking position even by steering wheel turning back, the process in step S409 is performed again.

On the other hand, when the result is "Yes" in step S413 or the result is "Yes" in step S416, that is, when state control section 112 determines that the host vehicle can be parked at the target parking position at least with steering wheel turning back, the flow proceeds to step S417.

In step S417, image display section 102 displays a rearward-movement start indicating icon created by image creating section 113 and state control section 112 determines in step S418 whether or not the host vehicle starts rearward-movement. When the result is "No" in step S418, the process in step S409 is performed again. On the other hand, when the result is "Yes" in step S418, that is, when state control section 112 acquires a reverse signal from gear position sensor 106, in step S419, control calculating section 114 instructs vehicle control section 103 to perform automatic parking along the calculated route.

Figure 5C:
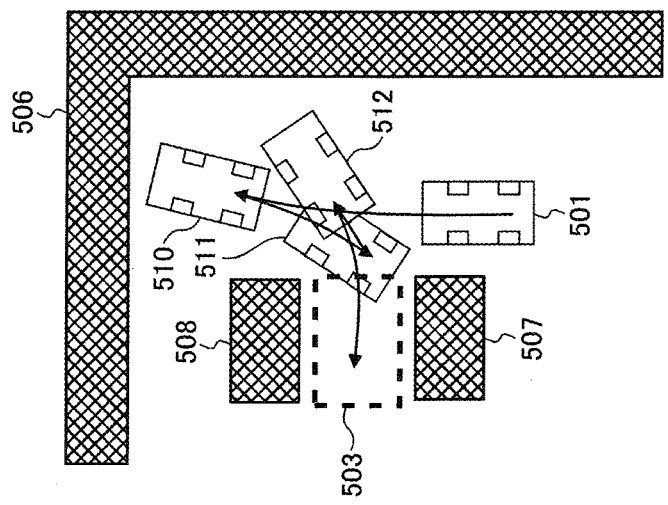
FIG. 5C illustrates an image of a situation where the presence of an obstacle constrains the rearward-movement start position and requires parking by steering wheel turning back.
Figure 5B:
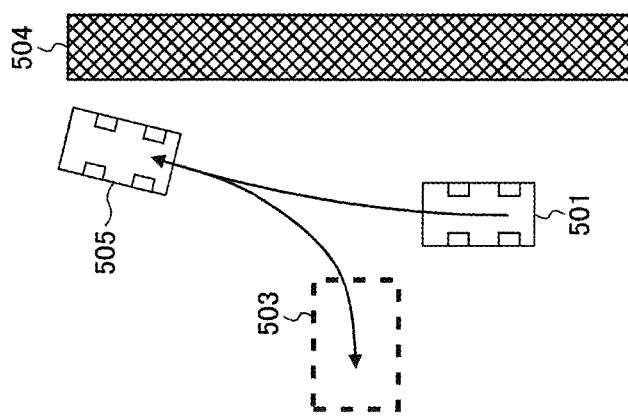
FIG. 5B illustrates an image of a situation where the presence of an obstacle constrains the rearward-movement start position.
Figure 5A:
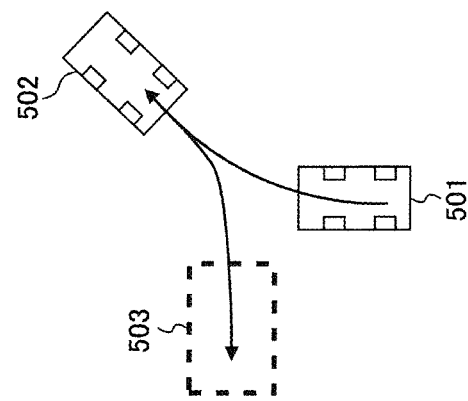
FIG. 5A illustrates an image of a situation where there is no obstacle and the vehicle can be freely parked.

Next, effects of the icon display in step S408 in FIG. 4 will be described. FIG. 5A shows a state in which host vehicle 501 has moved forward to rearward-movement start position 502 for parking at target parking position 503. FIG. 5B shows a state in which host vehicle 501 has moved forward to rearward-movement start position 505 avoiding obstacle 504 such as a wall for parking at target parking position 503. FIG. 5C shows a state in which when there are obstacle 506 such as a wall and parked vehicles 507 and 508 around target parking position 503, host vehicle 501 temporarily moves rearward from rearward-movement start position 510 to steering wheel turn-back position 511 for parking at target parking position 503, then turns the steering wheel back and moves forward to rearward-movement start position 512 after turning the steering wheel back.

Since there are obstacles such as other parked vehicles, walls, columns in an actual parking area as shown in FIGS. 5B and 5C, one ideal rearward-movement start position cannot always be reached. Moreover, when the parking area is narrow, it may not be possible to park the vehicle at one try, and in that case, the steering wheel needs to be turned back one or more times for parking. Thus, since the rearward-movement start position varies depending on the situation of the parking area, it is preferable to leave a decision and operation up to the user as far as the rearward-movement start position.

Thus, the parking assistance apparatus of the present invention displays icons indicating a plurality of regions corresponding to recommended rearward-movement start positions on image display section 102 to allow the user to drive the host vehicle as far as the rearward-movement start position with a time allowance. Moreover, since the parking assistance apparatus indicates a range in which parking is possible at one try or a range in which parking is possible by turning the steering wheel back, this can serve as information for the user to make a decision on the rearward-movement start position.

Figure 6:
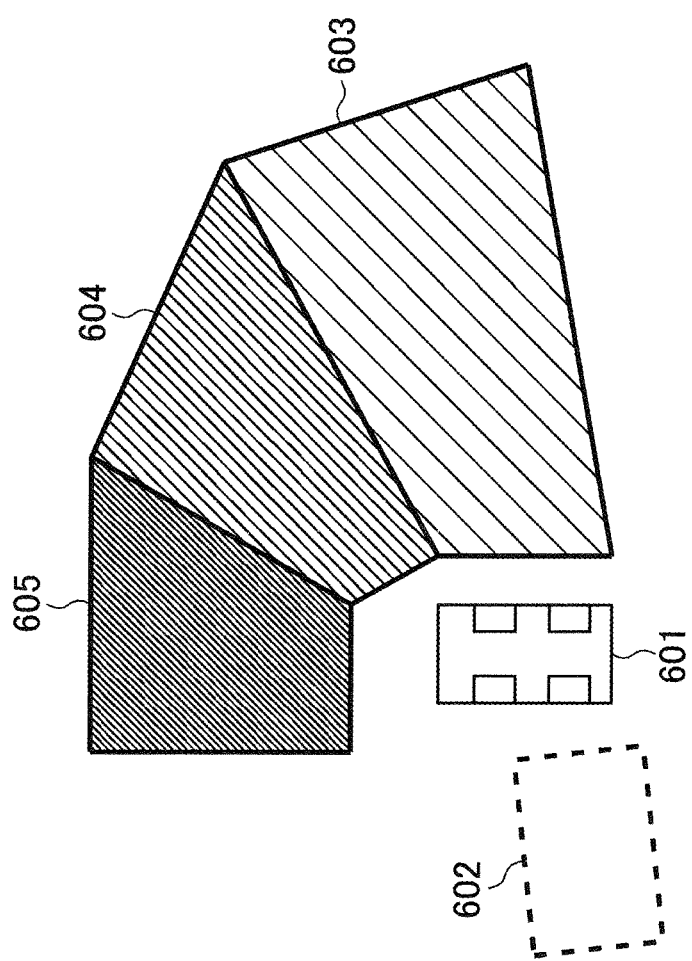
FIG. 6 illustrates an image of a plurality of regions indicating a rearward-movement start position displayed on an image display section which is a main part in FIG. 1.

FIG. 6 illustrates an image of a plurality of regions corresponding to a rearward-movement start position displayed on image display section 102 in step S408. As shown in FIG. 6, in order to park host vehicle 601 at target parking position 602, image display section 102 displays three icons indicating first region 603 where parking is possible without steering wheel turning back, second region 604 where parking is possible with or without steering wheel turning back and third region 605 where parking is possible by turning the steering wheel back as a plurality of regions indicating the rearward-movement start position. This allows the user to recognize that it is possible to park host vehicle 601 at target parking position 602 by only moving the vehicle so as to fit in at least the frames of first to third regions 603 to 605. This gives the user a time allowance in driving operation when moving host vehicle 601 to the rearward-movement start position.

Figure 7:
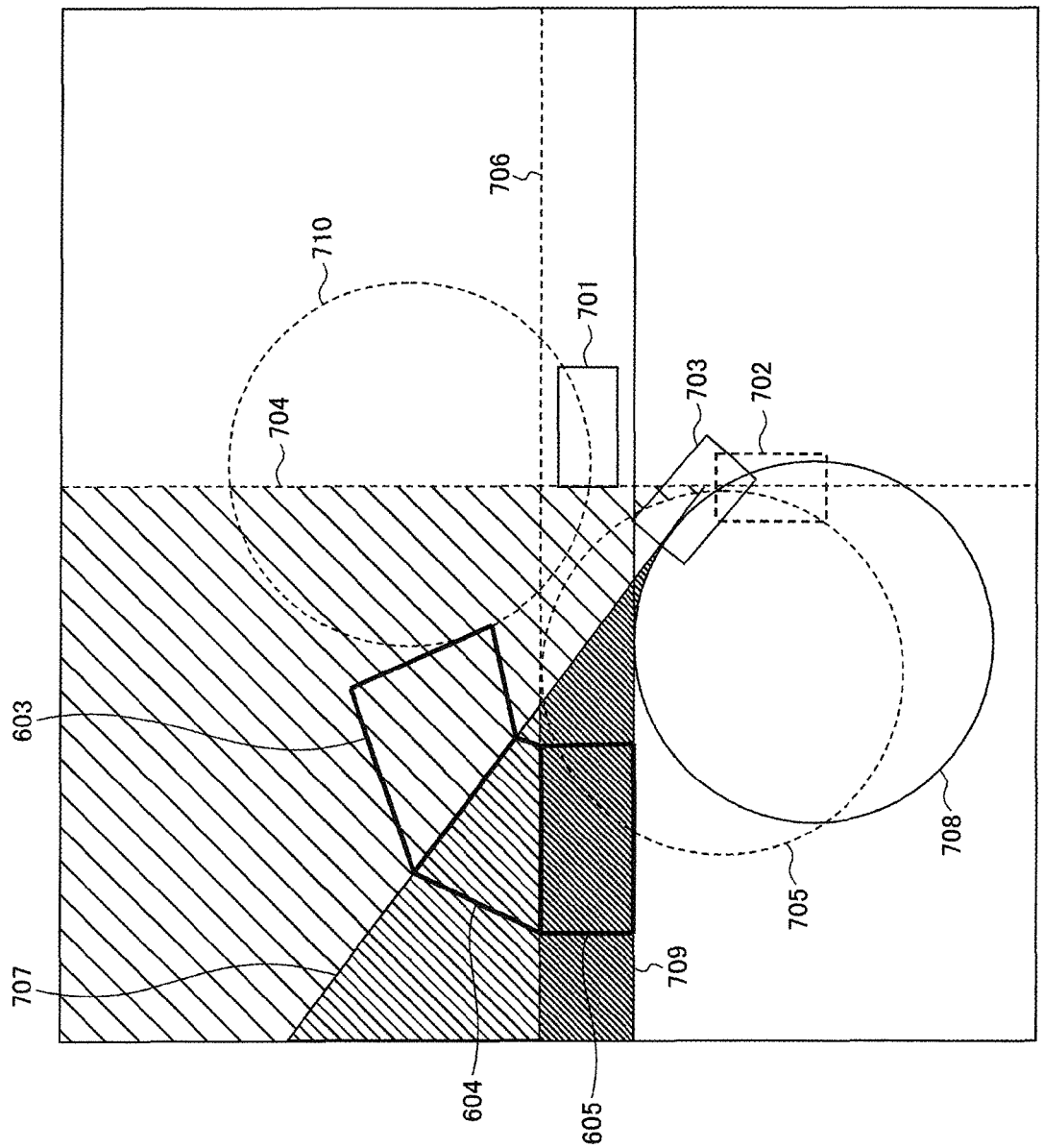
FIG. 7 illustrates an image of setting a plurality of regions indicating the rearward-movement start position in FIG. 6.

Here, settings of first to third region 603 to 605 in FIG. 6 will be described. FIG. 7 illustrates an image of setting a plurality of regions indicating the rearward-movement start position in FIG. 6. Processing in FIG. 7 is calculated by state control section 112. In FIG. 7, when parking start position 701 and target parking position 702 are set, steering wheel turn-back position 703 is defined.

Straight line 704 extending straight ahead from target parking position 702, arc 705 at a maximum steering angle of the vehicle to be parked at target parking position 702 and straight line 706 contacting this arc 705 and orthogonal to straight line 704 are calculated. A parkable region without steering wheel turning back is represented by a region sandwiched by this straight line 704, arc 705 and straight line 706.

Next, straight line 707 extending straight ahead from steering wheel turn-back position 703, arc 708 at a maximum steering angle of the vehicle passing through steering wheel turn-back position 703 and straight line 709 contacting this arc 708 and orthogonal to straight line 704 are calculated.

A parkable region with steering wheel turning back is represented by a region sandwiched by straight line 707, arc 708 and straight line 709. A boundary between first region 603 where parking is possible without steering wheel turning back and second region 604 where parking is possible with or without steering wheel turning back is represented by straight line 707. Furthermore, a boundary between second region 604 where parking is possible with or without steering wheel turning back and third region 605 where parking is possible by turning the steering wheel back is represented by straight line 706.

A boundary on an opposite side of first region 603 is set to a tangent with arc 710 at a maximum steering angle from parking start position 701. On the other hand, a boundary on an opposite side of third region 605 is set to straight line 709 along which the host vehicle can reach steering wheel turn-back position 703 at a maximum steering angle after moving straight forward or rearward. Second region 604 is represented by a region sandwiched between straight line 706 and straight line 707.

Figure 8:
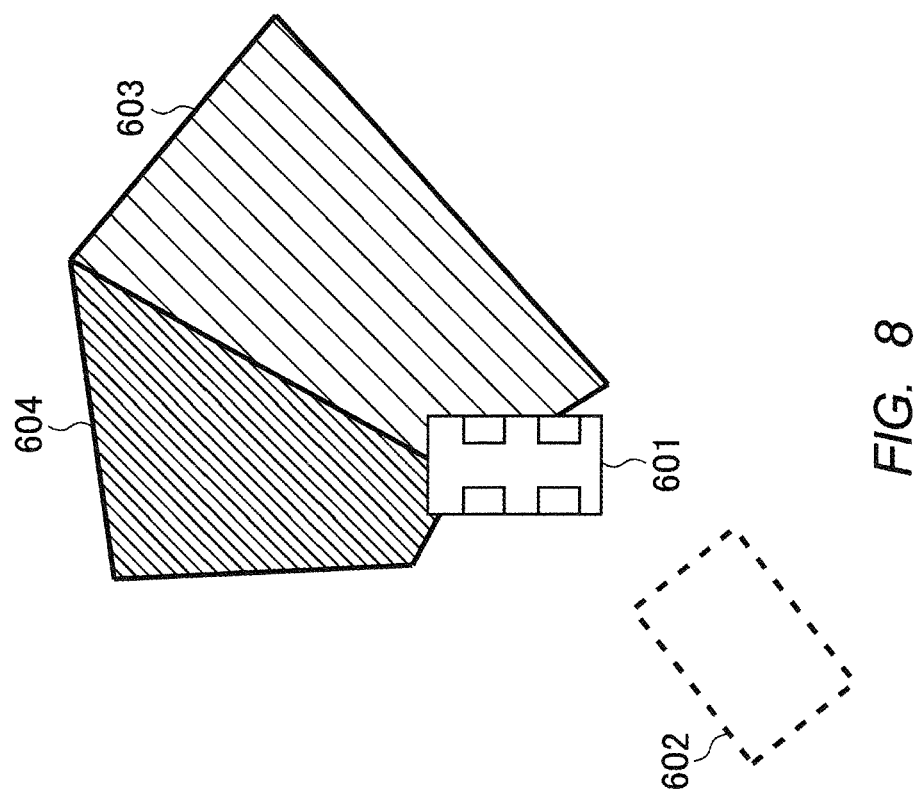
FIG. 8 illustrates an image of a state in which the host vehicle moves forward from the state in FIG. 6 into a position between a first region where parking is possible without steering wheel turning back and a second region where parking is possible with or without steering wheel turning back.

Next, a screen transition of image display section 102 when host vehicle 601 moves forward from the state in FIG. 6 will be described. FIG. 8 illustrates an image of a state in which the host vehicle moves forward into a position between the first region where parking is possible without steering wheel turning back and the second region where parking is possible with or without steering wheel turning back. When host vehicle 601 moves forward and host vehicle 601 can no longer reach third region 605 in FIG. 6 even at a maximum steering angle, as shown in FIG. 8, image display section 102 displays only first region 603 and second region 604, and erases third region 605. As host vehicle 601 moves forward, a range of guidance to a rearward-movement start position is narrowed down, and it is thereby possible to make a tradeoff between the degree of freedom of guidance and accuracy. In the present embodiment, as shown in FIG. 6 and FIG. 8, image display section 102 displays an image in which the display position of host vehicle 601 is fixed and the background is changed, but image display section 102 may display an image in which the background is fixed and host vehicle 601 is changed.

Figure 9:
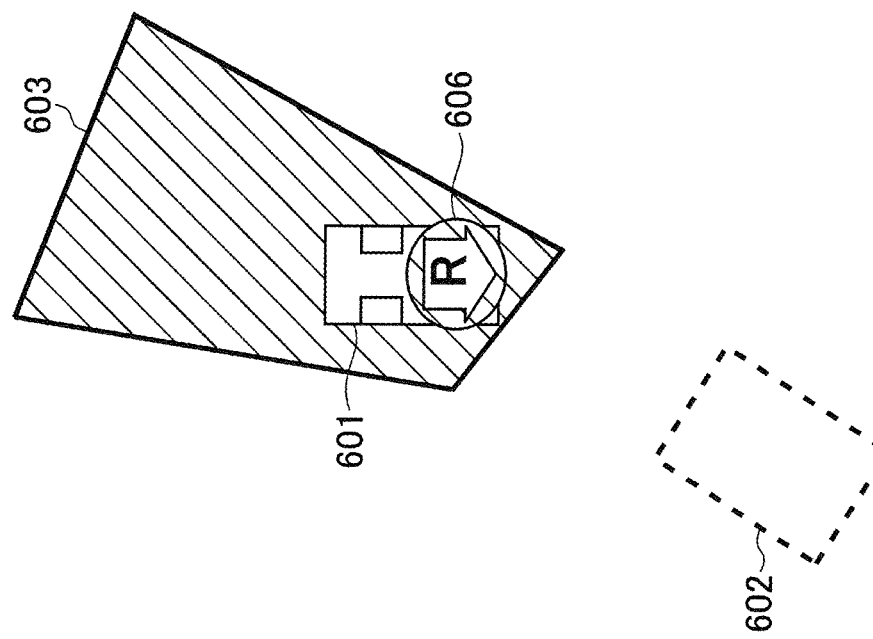
FIG. 9 illustrates an image of a state in which the host vehicle reaches an appropriate angle from the state in FIG. 8 at a first region where parking is possible without steering wheel turning back.
Figure 10:
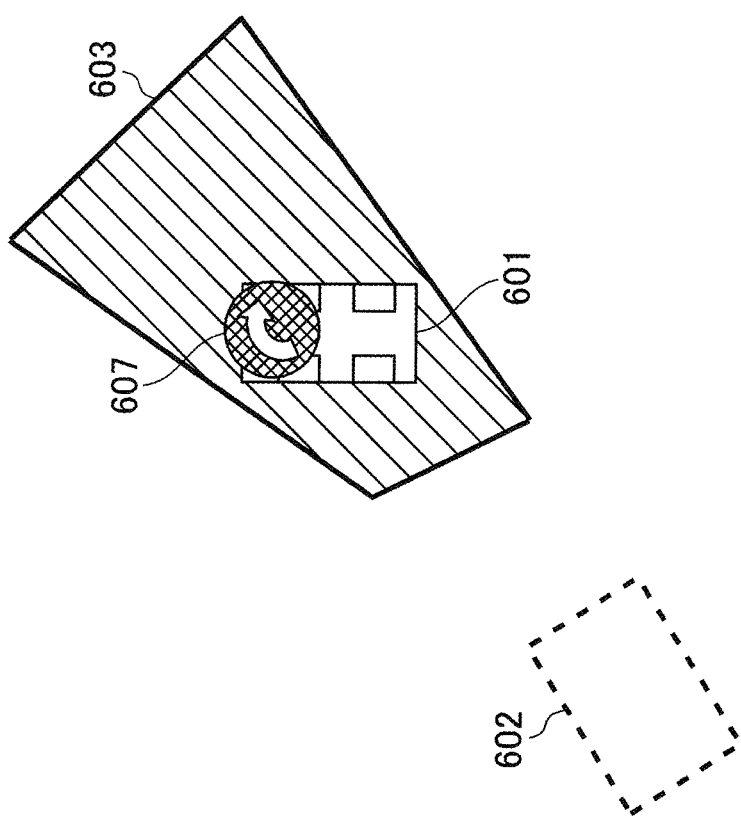
FIG. 10 illustrates an image of a state in which the host vehicle reaches, at an inappropriate angle from the state in FIG. 8, a first region where parking is possible without steering wheel turning back.

Next, as shown in FIG. 9 and FIG. 10, a screen transition of image display section 102 when host vehicle 601 further moves forward from the state in FIG. 8 will be described. FIG. 9 illustrates an image of a state in which host vehicle 601 reaches at an appropriate angle in first region 603 where parking is possible without steering wheel turning back. On the other hand, FIG. 10 illustrates an image of a state in which host vehicle 601 reaches at an inappropriate angle in first region 603 where parking is possible without steering wheel turning back.

As shown in FIG. 9, when state control section 112 determines in step S413 that angle correction is unnecessary, image display section 102 displays rearward-movement start indicating icon 606 superimposed on host vehicle 601 by image creating section 113. On the other hand, as shown in FIG. 10, in step S413, when state control section 112 determines that angle correction is necessary, image display section 102 displays angle correction indicating icon 607 superimposed on host vehicle 601 by image creating section 113. After that, when it is determined that angle correction is unnecessary, this angle correction indicating icon 607 is erased, and rearward-movement start indicating icon 606 in FIG. 9 is displayed. Such control makes it possible to modify a situation in which although the vehicle has reached inside the region indicating the rearward-movement start position, it is actually not possible to park the vehicle using a parking method shown by the region.

Figure 11:
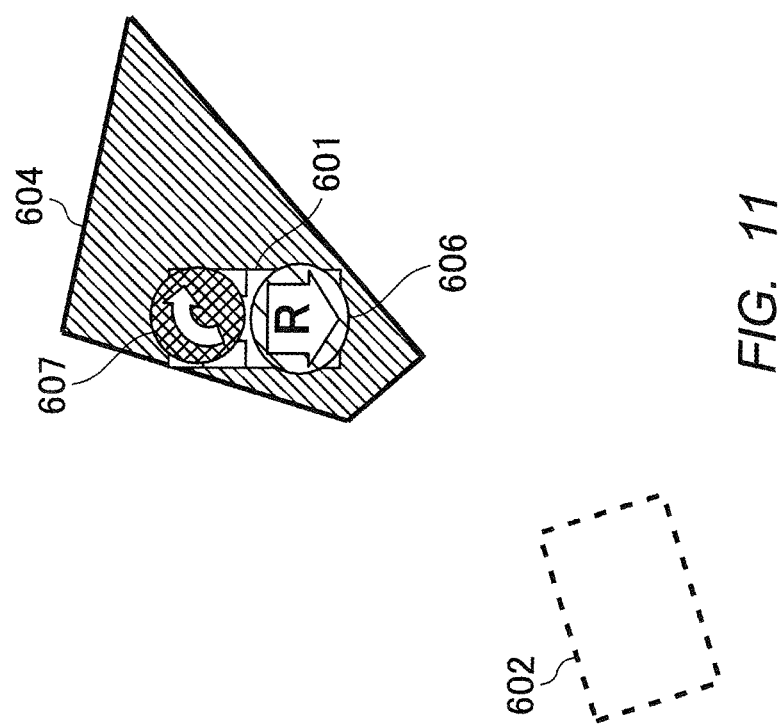
FIG. 11 illustrates an image of a state in which the host vehicle reaches, from the state in FIG. 6, a second region where parking is possible with or without steering wheel turning back and the vehicle can further move to the first region with angle correction.

Next, a state will be described using FIG. 11 in which the host vehicle reaches from the state in FIG. 6 second region 604 where parking is possible with or without steering wheel turning back, where although parking with steering wheel turning back is possible, parking without steering wheel turning back is also possible by angle correction. In this case, as shown in FIG. 11, image display section 102 displays rearward-movement start indicating icon 606 and angle correction indicating icon 607 superimposed on host vehicle 601 by image creating section 113. This allows the user to select an easier parking method.

Figure 12B:
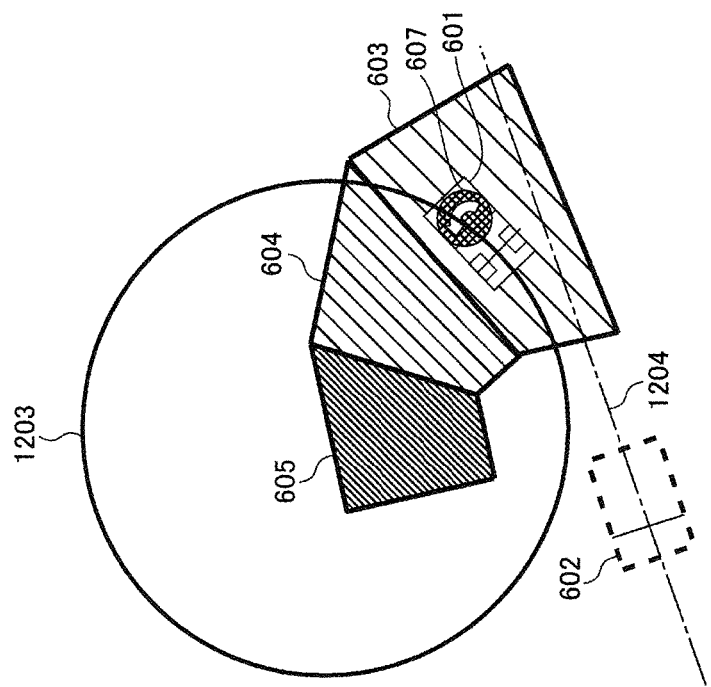
FIGS. 12A and 12B illustrate an image of a method of calculating an angle correcting direction indicated when the host vehicle reaches from the state in FIG. 6 a first region where parking is possible without steering wheel turning back.
Figure 12A:
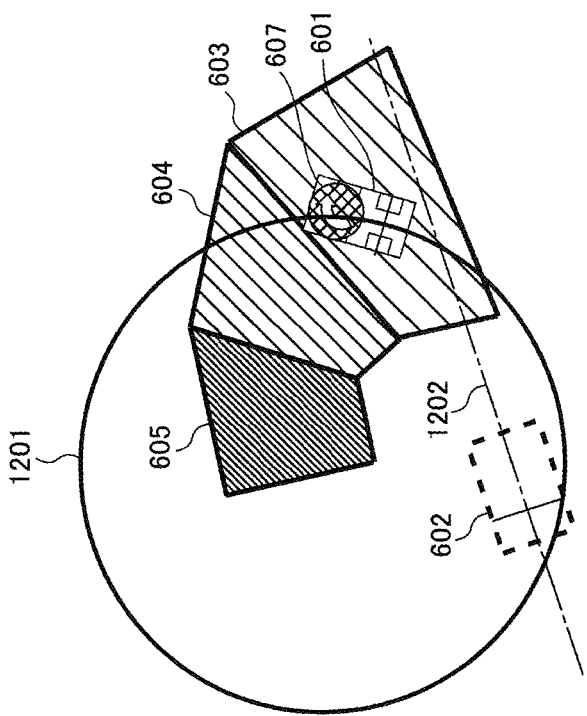

Next, a calculation of an angle correcting direction will be described using FIG. 12, which is indicated when host vehicle 601 reaches from the state in FIG. 6 first region 603 where parking is possible without steering wheel turning back. The angle correction indicating direction is determined from a relationship between a circle of rotation and an extension of the target parking position based on a minimum rotating radius (plus a margin). In an angle relationship during rearward parking, an ideal relationship is that a circle of rotation based on a minimum rotation radius (plus margin) of the host vehicle contacts an extension of a target parking position at one point. When extension contacts at one point or approaches the circle of rotation, automatic parking can be started. More specifically, automatic parking can be started for an angle relationship in which the distance between the circle of rotation and the extension is equal to or below a predetermined value.

Thus, state control section 112 determines an angle correction indicating direction so as to satisfy a relationship in which the distance between this circle of rotation and extension is equal to or below this predetermined value. That is, when host vehicle 601 has a position relationship shown in FIG. 12A, if circle of rotation 1201 crosses extension 1202 of target parking position 602, state control section 112 indicates a right direction in which circle of rotation 1201 does not cross extension 1202. On the other hand, when host vehicle 601 has a position relationship shown in FIG. 12B if the circle of rotation 1203 is separate from extension 1204 of target parking position 602, state control section 112 indicates a left direction in which circle of rotation 1203 approaches extension 1204.

Thus, according to Embodiment 1, it is possible to alleviate a driver's driving burden of moving the host vehicle to a rearward-movement start position and facilitate guidance of the host vehicle from the rearward-movement start position to a target parking position.

(Embodiment 2)

Since a configuration of a parking assistance apparatus according to Embodiment 2 of the present invention is similar to the configuration of Embodiment 1 shown in FIG. 1, detailed description thereof will be omitted and the present embodiment will be described with reference to FIG. 1.

Figure 13:
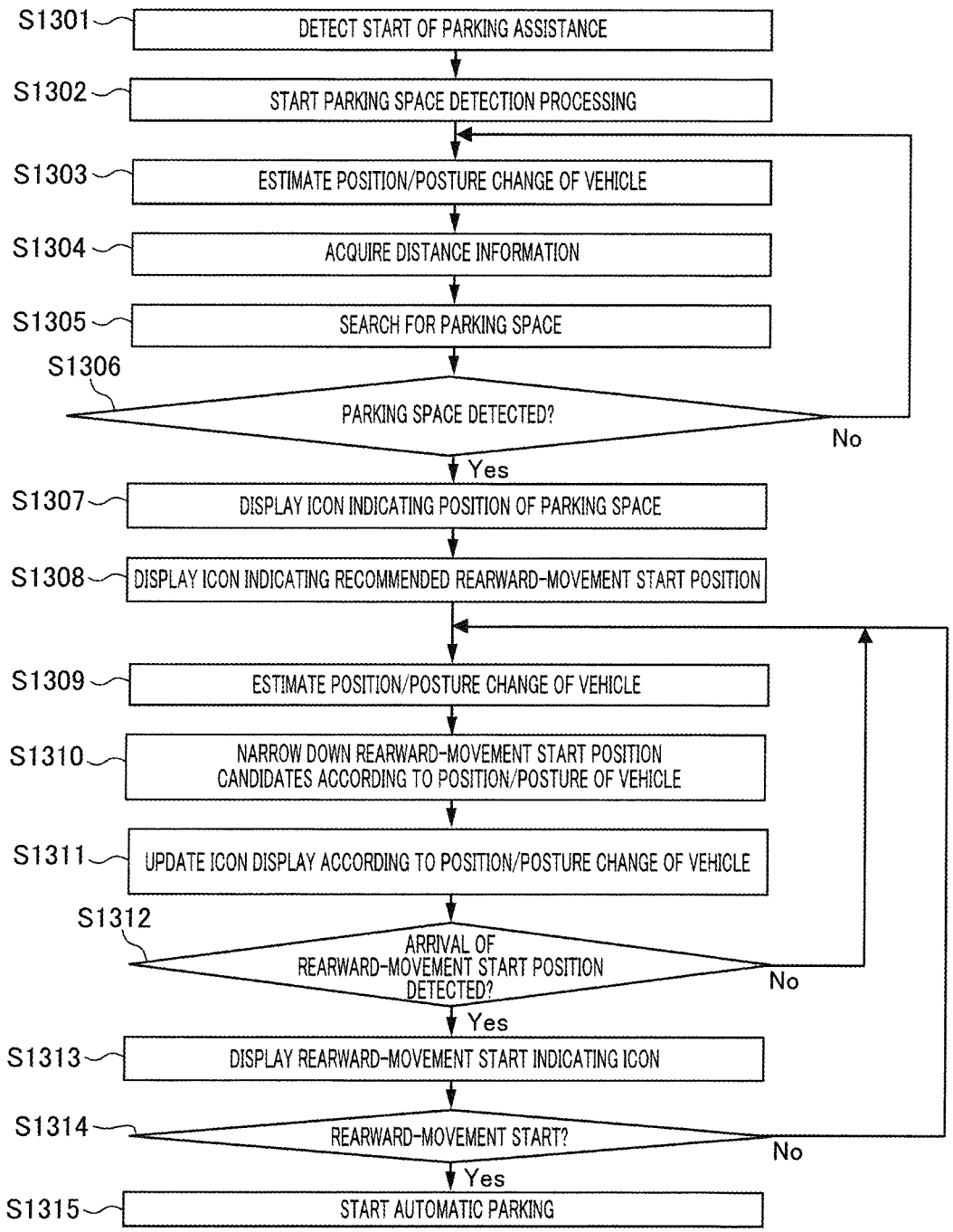
FIG. 13 is a flowchart describing processing by an automatic parking assistance apparatus according to Embodiment 2 of the present invention.

Parking assistance processing by the parking assistance apparatus according to Embodiment 2 of the present invention will be described using a flowchart in FIG. 13.

First, in step S1301, when the user presses user operation button 107 and inputs a parking assistance start, state control section 112 detects a start of parking assistance, and in step S1302, state control section 112 starts parking space detection processing as a target parking position.

In step S1303, state control section 112 estimates a current position and a posture change of the host vehicle with respect to the parking start position based on steering angle information acquired from steering angle sensor 104 and vehicle speed information acquired wheel speed sensor 105. Note that the "posture" means an angle change of the host vehicle at the current position with respect to the host vehicle at a parking start position.

In step S1304, state control section 112 acquires distance information from distance sensor 101 via distance information acquiring section 110, and in step S1305, state control section 112 searches for a parking space as a target parking position.

In step S1306, state control section 112 determines whether or not any parking space is detected as a target parking position. When the result is "No" in step S1306, the process in step S1303 is performed again. On the other hand, when the result is "Yes" in step S1306, image display section 102 displays an icon indicating the position of a parking space as a target parking position created by image creating section 113 in step S1307.

In step S1308, image display section 102 displays a region corresponding to a recommended rearward-movement start position created by image creating section 113 using an icon. This icon may indicate a plurality of regions. For example, there may be three icons indicating a first region where parking is possible without steering wheel turning back, a second region where parking is possible with or without steering wheel turning back and a third region where parking is possible by turning the steering wheel. The user can move forward the host vehicle toward a rearward-movement start position according to this icon display.

In step S1309, while the host vehicle is moving forward, state control section 112 estimates the position and a posture change of the host vehicle similar to those in step S1303 as appropriate, and in step S1310, narrows down rearward-movement start position candidates based on the information on the position and posture of the host vehicle estimated in step S1309. More specifically, state control section 112 excludes from candidates, regions determined to be unreachable by the host vehicle at a maximum turning angle. Here, the determination to be unreachable by the host vehicle may be made when, for example, the entire host vehicle cannot enter the region or when the center of the rear wheel axle cannot enter the region.

In step S1311, image display section 102 displays an icon image updated by image creating section 113 according to the position and posture change of the host vehicle.

More specifically, image display section 102 displays only icons indicating regions reachable by the host vehicle except the icons indicating the regions excluded in step S1310.

In step S1312, state control section 112 determines whether or not the host vehicle has reached the rearward-movement start position based on the information on the current position and posture of the host vehicle calculated as appropriate and information on the recommended rearward-movement start position. When the result is "No" in step S1312, the process in step S1309 is performed again. On the other hand, when the result is "Yes" in step S1312, the flow proceeds to step S1313.

In step ST1313, image display section 102 displays the rearward-movement start indicating icon created by image creating section 113, and in step S1314, state control section 112 determines whether or not the host vehicle has started rearward-movement. When the result is "No" in step S1314, the process in step S1309 is performed again. On the other hand, when the result is "Yes" in step S1314, that is, when state control section 112 acquires a reverse signal from gear position sensor 106, control calculating section 114 instructs vehicle control section 103 to perform automatic parking along the calculated route in step S1315.

Next, each mode of automatic parking will be described.

Figure 14:
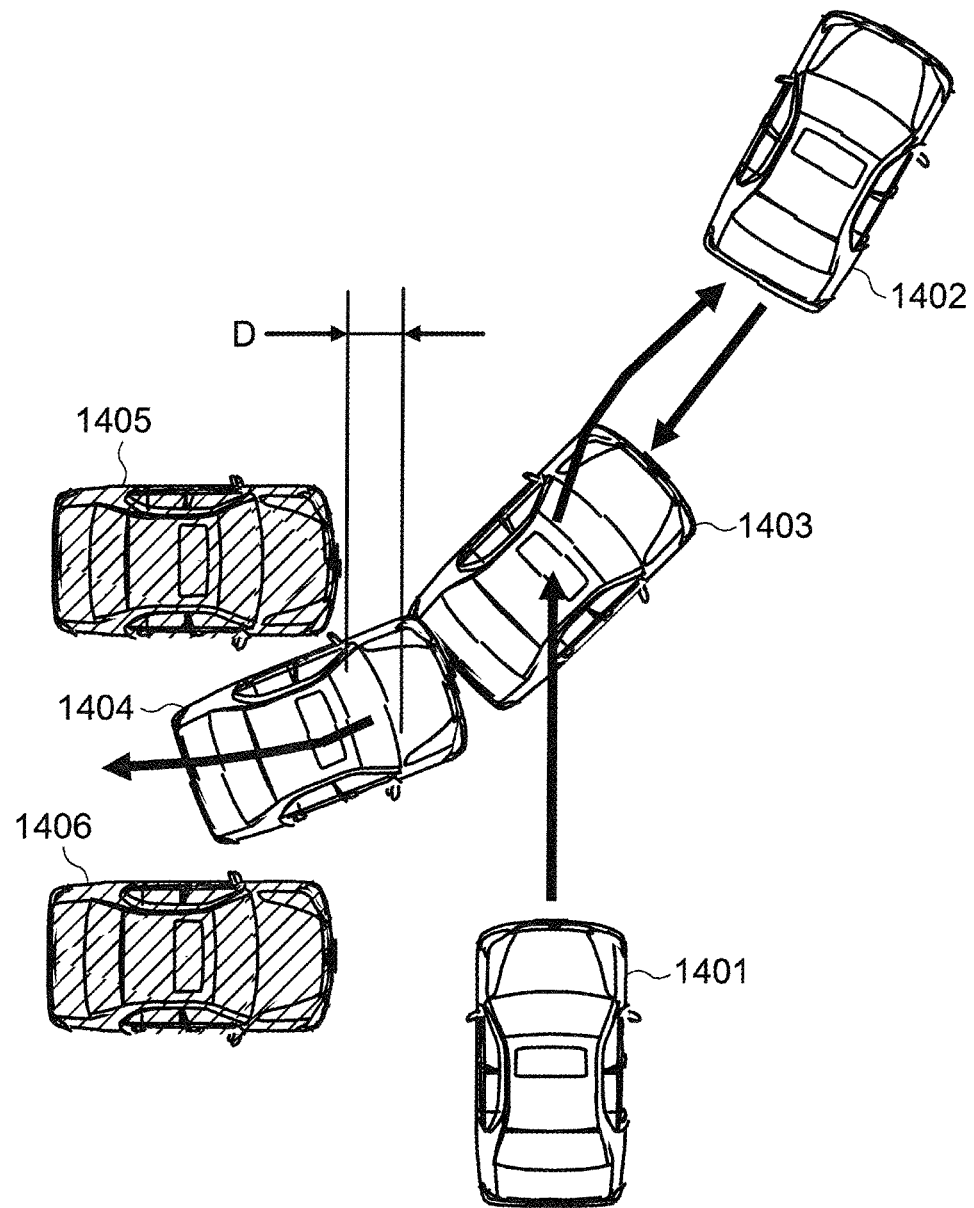
FIG. 14 illustrates an image of route guidance without steering wheel turning back during double parking calculated by the state control section which is a main part in FIG. 1.
Figure 15:
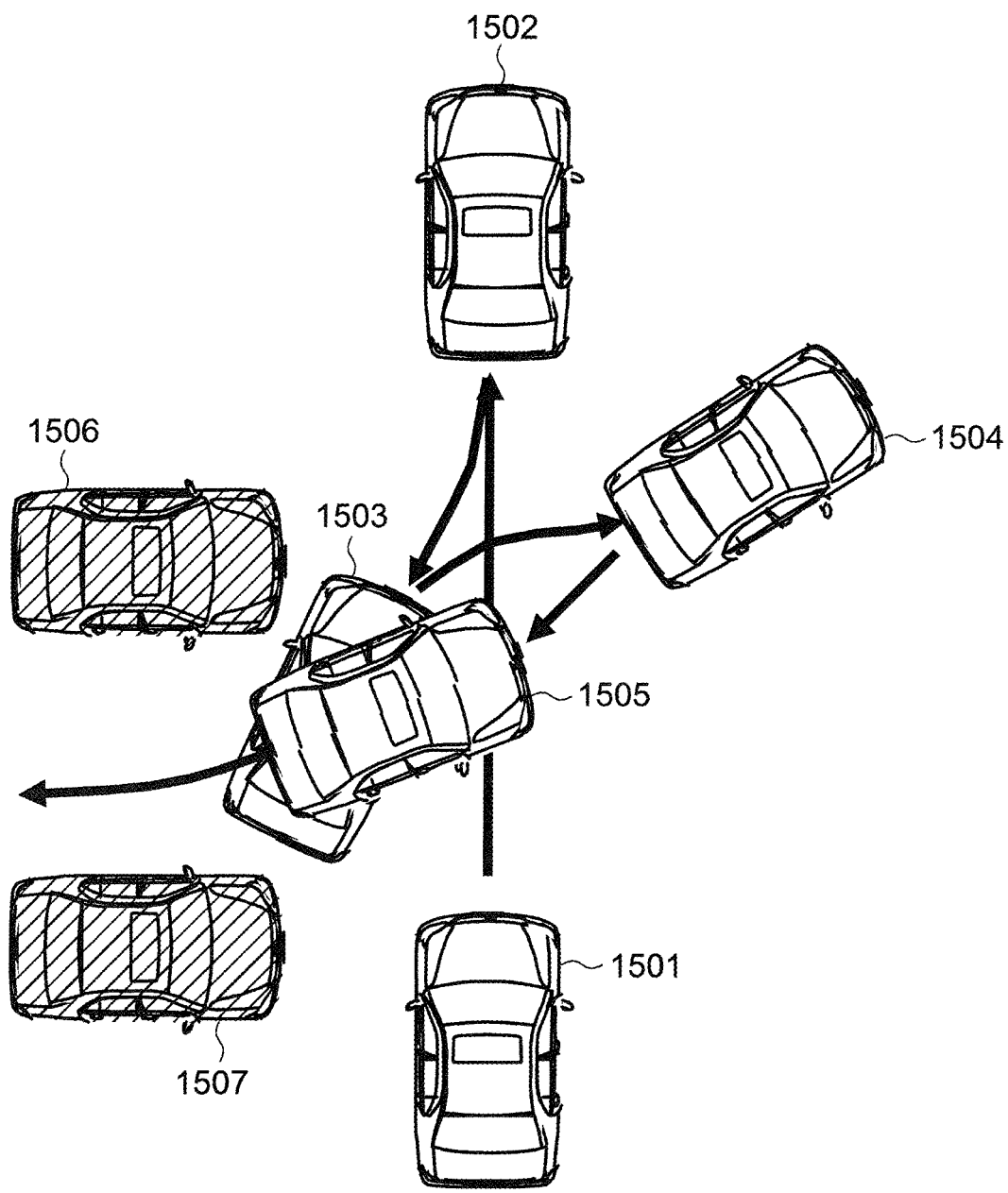
FIG. 15 illustrates an image of route guidance with steering wheel turning back during double parking calculated by the state control section which is a main part in FIG. 1.
Figure 16:
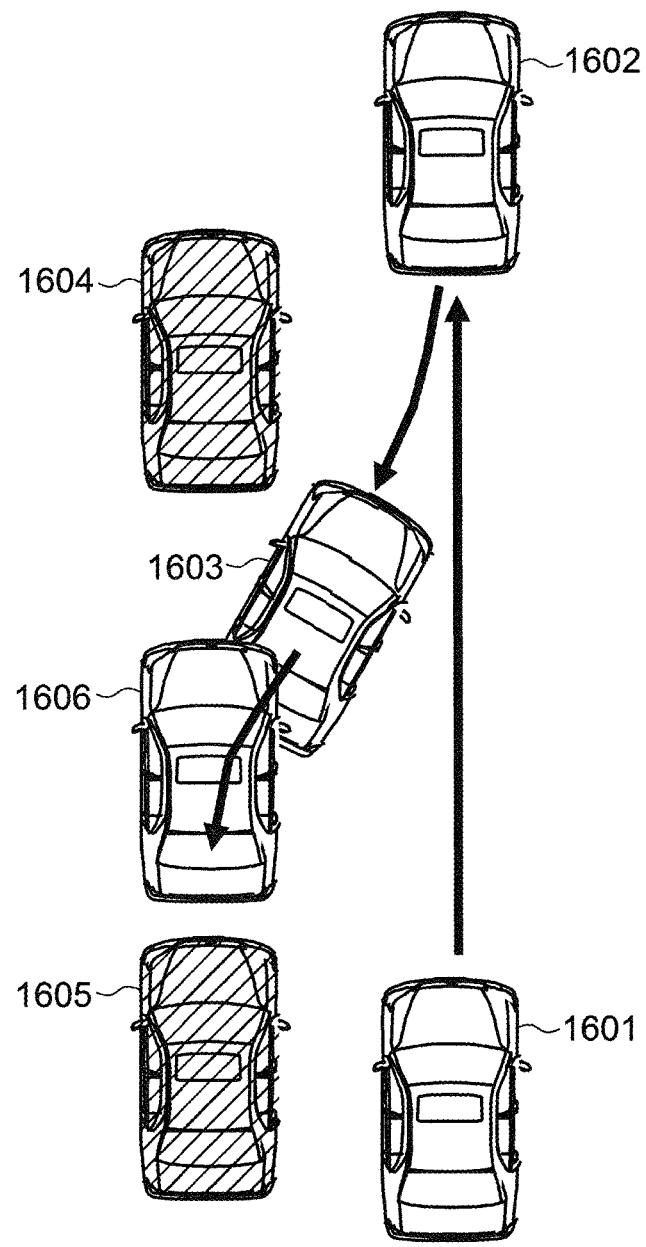
FIG. 16 illustrates an image of route guidance without steering wheel turning back during parallel parking calculated by the state control section, which is a main part in FIG. 1.
Figure 17:
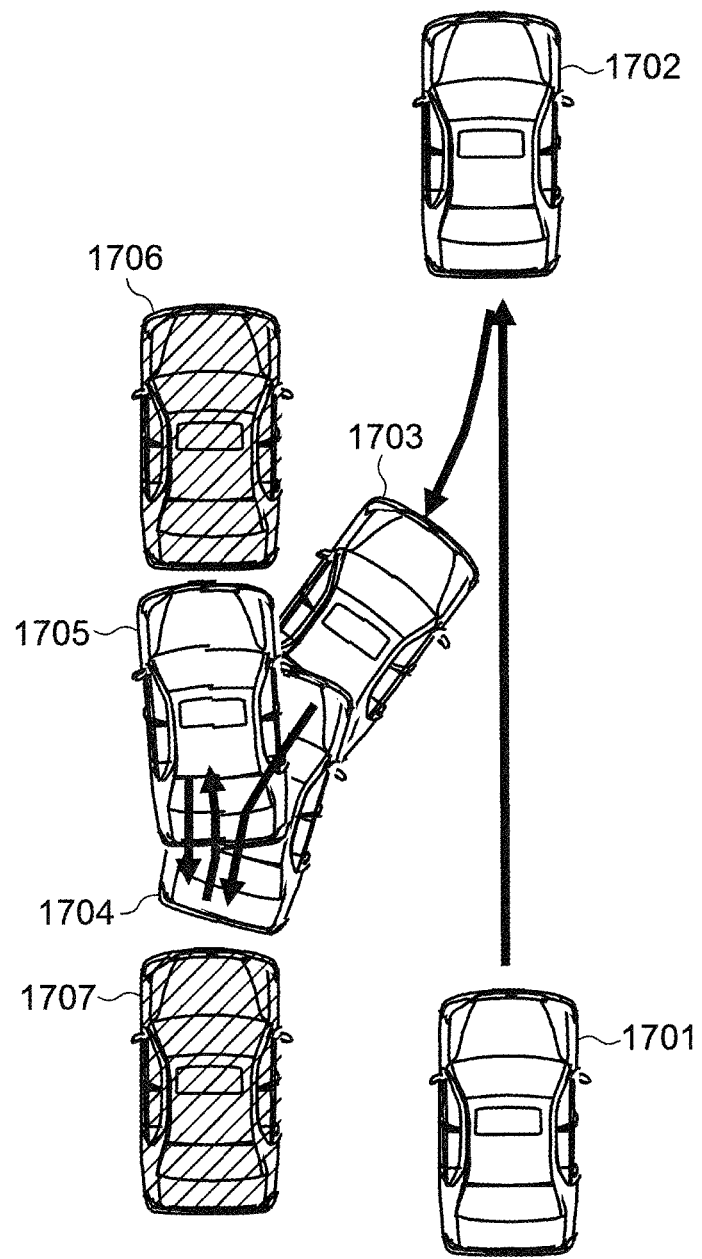
FIG. 17 illustrates an image of route guidance with steering wheel turning back during parallel parking calculated by the state control section which is a main part in FIG. 1.

FIG. 14 illustrates an image of route guidance without steering wheel turning back during double parking calculated by state control section 112 FIG. 15 illustrates an image of route guidance with steering wheel turning back during double parking calculated by state control section 112. FIG. 16 illustrates an image of route guidance without steering wheel turning back during parallel parking calculated by state control section 112. FIG. 17 illustrates an image of route guidance with steering wheel turning back during parallel parking calculated by state control section 112. Although FIG. 14 to FIG. 17 describe an automatic parking mode to the left side, automatic parking similar to the automatic parking mode to the left side is applied to the automatic parking mode to the right side by only reversing the left and right.

In FIG. 14, the host vehicle moves straight forward from position 1401 and turns to rearward-movement start position 1402 by a rightward steering operation. After reaching rearward-movement start position 1402, the host vehicle starts rearward-movement triggered by detection of a reverse state through gear position sensor 106. The host vehicle is double-parked in a parking space between parked vehicles 1405 and 1406 by a leftward steering operation after passing through position 1403.

In FIG. 15, the host vehicle moves straight forward from position 1501, reaches parking start position 1502 and then moves rearward triggered by detection of a reverse state by gear position sensor 106 through a leftward steering operation. After reaching steering wheel turn-back position 1503, the host vehicle moves forward triggered by detection of a drive state by gear position sensor 106 and moves forward to rearward-movement start position 1504 through a rightward steering operation. After reaching rearward-movement start position 1504, the host vehicle starts rearward-movement triggered by detection of a reverse state by gear position sensor 106 and is double-parked in a parking space between parked vehicles 1506 and 1507 through a leftward steering operation after passing through position 1505.

In FIG. 16, the host vehicle moves straight forward from position 1601, reaches parking start position 1602 and then turns rearward triggered by detection of a reverse state by gear position sensor 106 through a leftward steering operation. After reaching steering position 1603, the host vehicle turns to parking space 1606 between parked vehicles 1604 and 1605 through a rightward steering operation and performs parallel parking.

In FIG. 17, the host vehicle moves straight forward from position 1701, reaches parking start position 1702 and turns rearward through a leftward steering operation triggered by detection of a reverse state by gear position sensor 106. After reaching steering position 1703, the host vehicle moves rearward through a rightward steering operation. After reaching steering wheel turn-back position 1704, the host vehicle turns forward through a leftward steering operation triggered by detection of a drive state by gear position sensor 106. After reaching rearward-movement start position 1705, the host vehicle moves rearward to a parking space between parked vehicles 1706 and 1707 and performs parallel parking triggered by detection of a reverse state by gear position sensor 106.

Figure 18A:
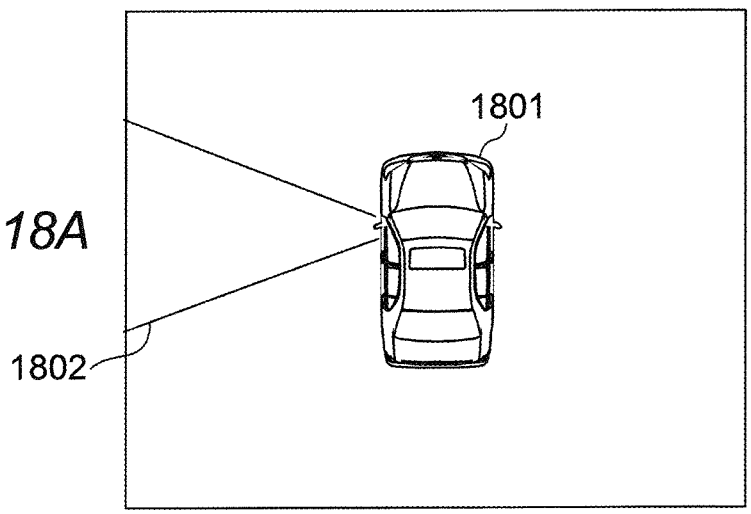
FIG. 18A illustrates an image of a detection range by a distance sensor displayed by the image display section, which is a main part in FIG. 1.
Figure 18B:
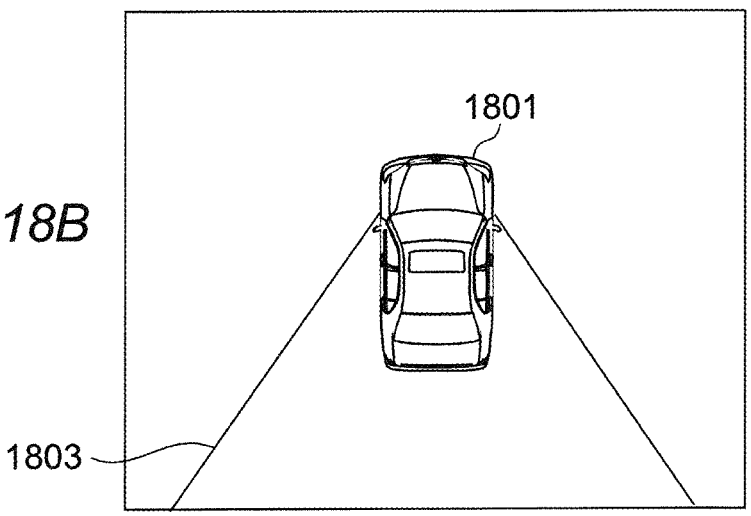
FIG. 18B illustrates an image of a visual recognition range of a side mirror seen from a driver's seat displayed by the image display section, which is a main part in FIG. 1.
Figure 18C:
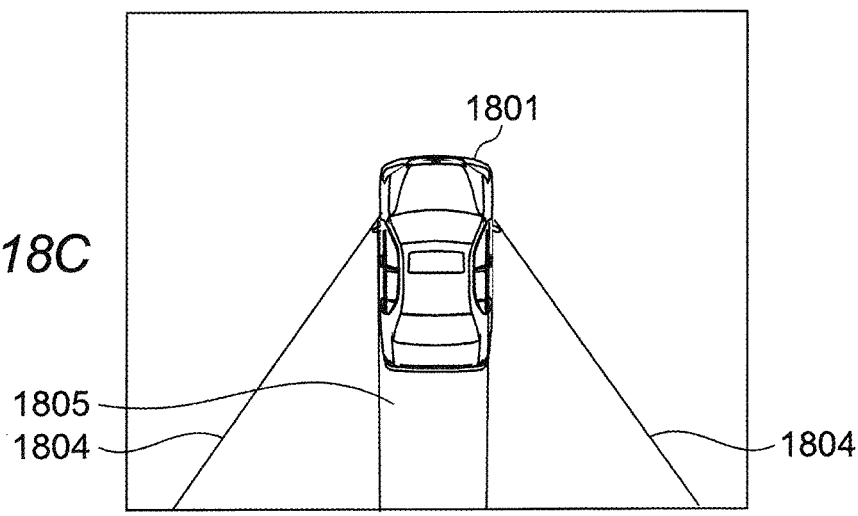
FIG. 18C illustrates an image of a visual recognition range of a side mirror seen from the driver's seat and a visual recognition range of a room mirror seen from the driver's seat displayed by the image display section, which is a main part in FIG. 1.

Next, icons displayed on image display section 102 in each mode of automatic parking as shown in FIG. 14 to FIG. 17 will be described. FIG. 18A illustrates an image of a detection range by distance sensor 101. FIG. 18B illustrates an image of a visual recognition range of a side mirror seen from a driver's seat. FIG. 18C illustrates an image of a visual recognition range of the side mirror seen from the driver's seat and a visual recognition range of a room mirror seen from the driver's seat.

FIG. 18A shows icon 1802 displayed next to the image of host vehicle 1801, indicating a detection range of distance sensor 101. FIG. 18B shows icon 1803 displayed diagonally behind host vehicle 1801, indicating a visual recognition range of the side mirror seen from the driver's seat. FIG. 18C shows icon 1804 diagonally behind host vehicle 1801, indicating a visual recognition range of the side mirror seen from the driver's seat and icon 1805 indicating a visual recognition range of the room mirror seen from the driver's seat.

Next, a transition of icon display in each mode of automatic parking will be described.

FIG. 19 to FIG. 24 illustrate screen display images of image display section 102.

Figure 19:
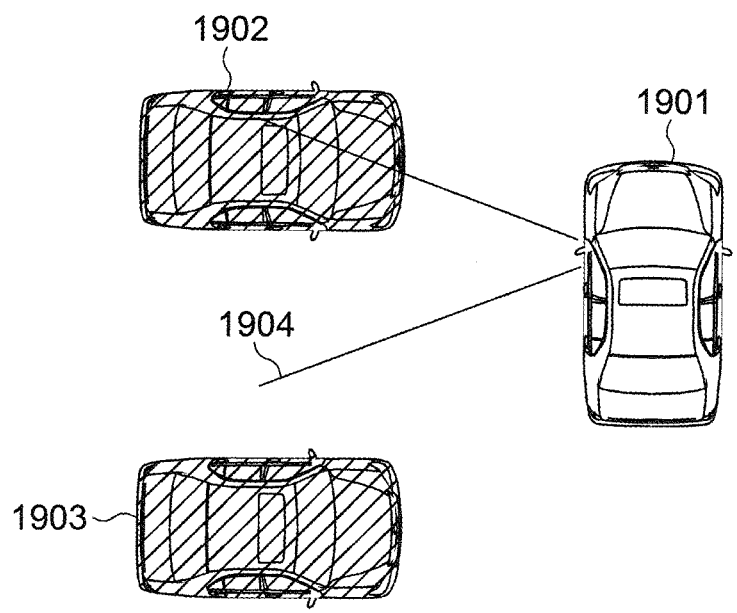
FIG. 19 illustrates an image of a display screen when the vehicle is moving to detect a target parking position during double parking.
Figure 20:
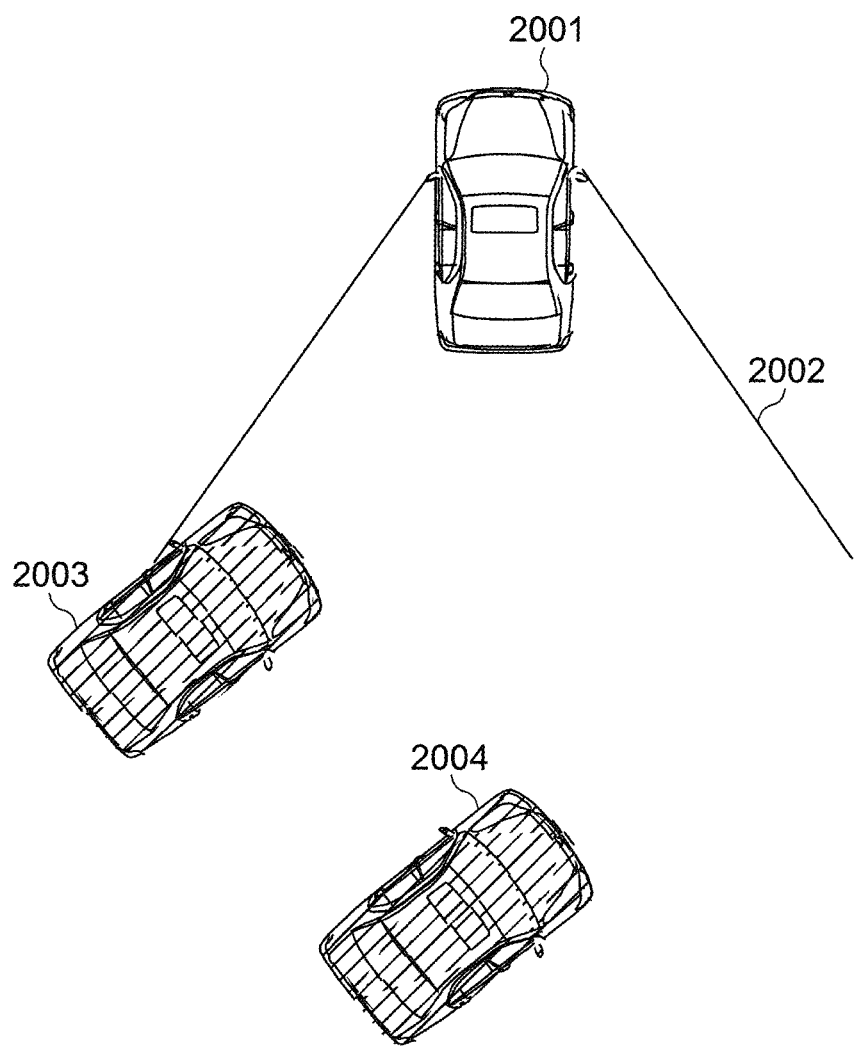
FIG. 20 illustrates an image of a display screen when the vehicle is moving rearward from a rearward-movement start position during double parking.
Figure 21:
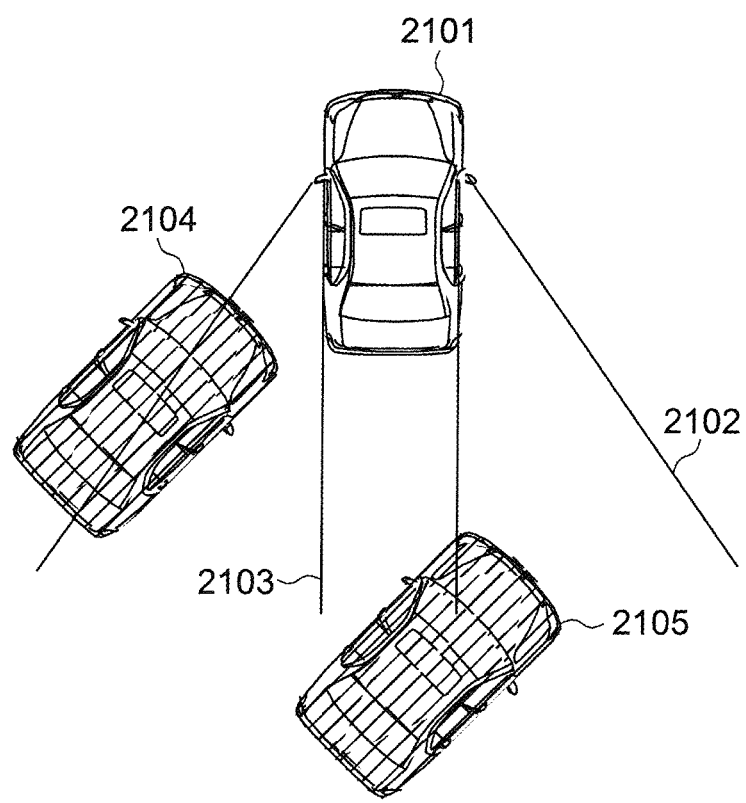
FIG. 21 illustrates an image of a display screen when the vehicle is moving to a target parking position during double parking.
Figure 22:
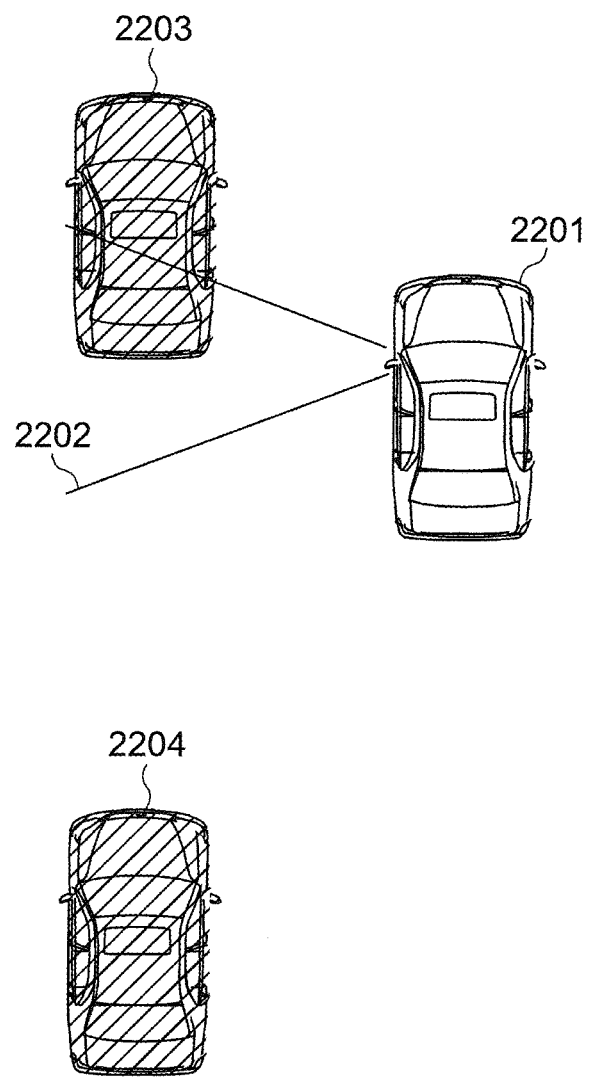
FIG. 22 illustrates an image of a display screen when the vehicle is moving to detect a target parking position during parallel parking.
Figure 23:
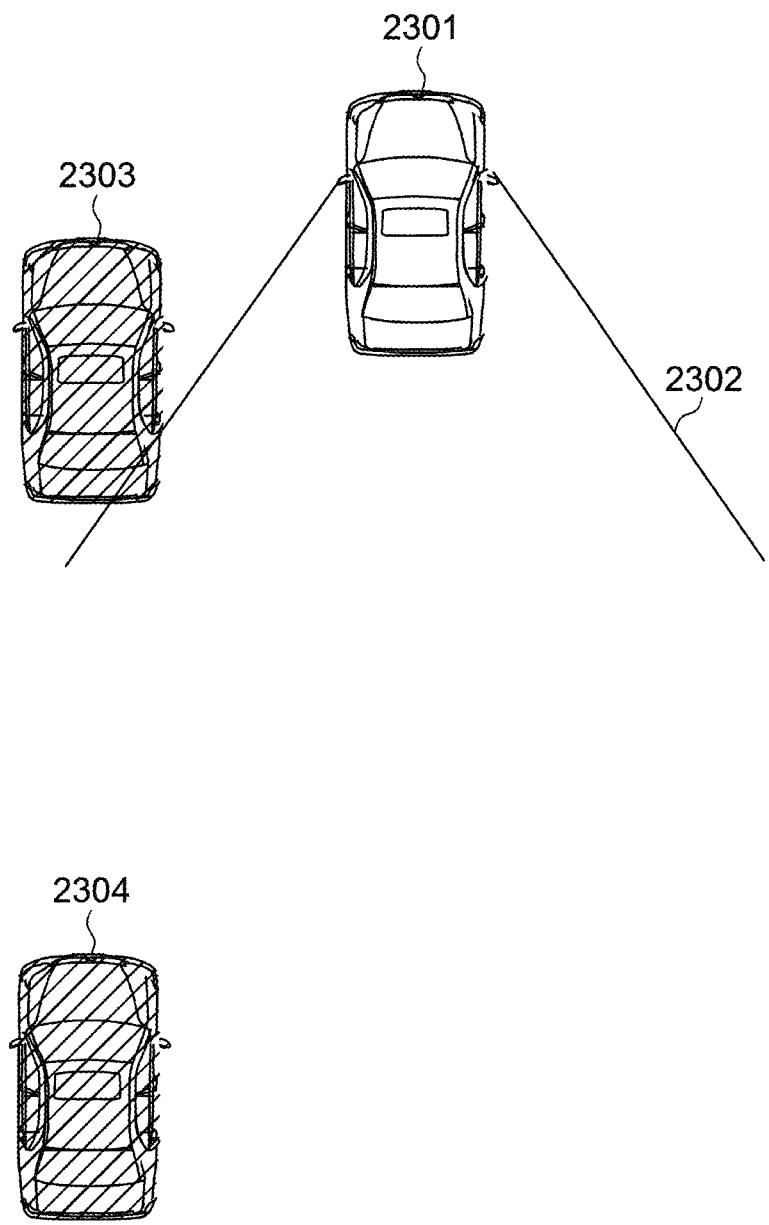
FIG. 23 illustrates an image of a display screen when the vehicle is moving rearward from a rearward-movement start position during parallel parking.
Figure 24:
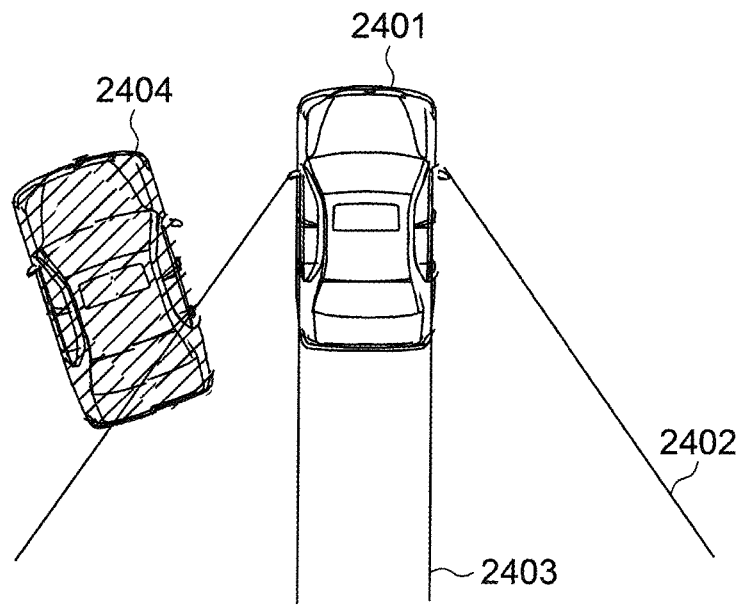
FIG. 24 illustrates an image of a display screen when the vehicle is moving to a target parking position during parallel parking.
Figure 24:
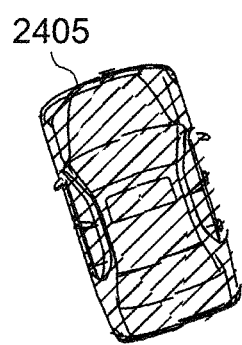

FIG. 19 to FIG. 21 illustrate a transition of icon display during double parking and FIG. 22 to FIG. 24 illustrate a transition of icon display during parallel parking FIG. 19 illustrates an image of a display screen when the vehicle is moving to detect a target parking position. FIG. 20 illustrates an image of a display screen when the vehicle is moving rearward from a rearward-movement start position. FIG. 21 illustrates an image of a display screen when the vehicle is moving to a target parking position. FIG. 22 illustrates an image of a display screen when the vehicle is moving to detect a target parking position. FIG. 23 illustrates an image of a display screen the vehicle is moving rearward from a rearward-movement start position. FIG. 24 illustrates an image of a display screen when the vehicle is moving to a target parking position. Since the same icon display transition processing is applied during both double parking and parallel parking, transition processing during double parking will be described hereinafter.

First, while moving the vehicle to detect a parking space as a target parking position, the driver tends to visually check to see whether or not the parking space really exists, at which positions parked vehicles are located, whether or not a detection result of distance sensor 101 is correct. Thus, as shown in FIG. 19, while host vehicle 1901 is moving forward to detect a parking space between parked vehicles 1902 and 1903, image display section 102 displays a sideward view of host vehicle 1901. Image display section 102 displays a detection range of distance sensor 101 from the position of the side mirror provided with distance sensor 101. With reference to FIG. 14, while the host vehicle is moving from position 1401 to rearward-movement start position 1402, detection range 1904 of distance sensor 101 shown in FIG. 19 is displayed.

Next, while the vehicle is moving from the rearward-movement start position to the target parking position, the risk of the vehicle of colliding with a nearest parked vehicle located therebehind is low, but the driver tends to visually check the rearward direction which is the running direction. For example, the driver may want to find a correspondence between a screen display and a real world about a target parking position to which the host vehicle is moving under automatic parking control.

Thus, as shown in FIG. 20, when host vehicle 2001 starts rearward-movement, or more specifically, when gear position sensor 106 detects a reverse state, image display section 102 displays visual recognition range 2002 of the side mirror when the diagonally rearward direction of host vehicle 2001 reflected in the side mirror is seen from the driver's seat. Describing with reference to FIG. 14, visual recognition range 2002 of the side mirror shown in FIG. 20 is displayed during a transition from rearward-movement start position 1402 to position 1403 at which the distance from parked vehicle 1405 becomes a predetermined value or below.

When FIG. 20 is taken as an example, by displaying visual recognition range 2002 during such a transition, the driver can recognize from the display screen of image display section 102 that the boundary of visual recognition range 2002 of the side mirror crosses parked vehicle 2003. Thus, it is possible to recognize that the parked vehicle reflected in the left side mirror in the real world corresponds to parked vehicle 2003 located behind host vehicle 2001, and thereby prevent confusion between the real world and the screen display. For example, it is possible to prevent confusion with neighboring parked vehicle 2004, for example.

While the vehicle is moving to a target parking position, that is, when the vehicle moves from a position at which the distance from neighboring parked vehicles falls to or below a predetermined value to the target parking position, the driver tends to visually check both a diagonally rearward direction and a rearward direction which is the running direction with respect to the host vehicle in order to prevent collision with the parked vehicles. For example, even when there is a time allowance between the host vehicle and neighboring parked vehicles in the screen display, there may be little allowance in the real world. Moreover, the driver tends to visually check the correspondence between the screen display and the real world regarding the distance from an obstacle such as a wall in the rearward direction of the host vehicle.

Thus, as shown in FIG. 21, when the distance between host vehicle 2101 and parked vehicle 2104 falls to or below a predetermined distance, image display section 102 displays visual recognition range 2102 of the side mirror when the diagonally rearward direction of host vehicle 2101 is seen from the driver's seat using the side mirror and visual recognition range 2103 of the room mirror when the rearward direction of host vehicle 2101 is seen from the driver's seat using the room mirror. Here, visual recognition range 2103 of the room mirror corresponds to a range enclosed by lines extending from both side ends of host vehicle 2101 in the vehicle length direction. Describing with reference to FIG. 14, visual recognition range 2102 of the side mirror and visual recognition range 2103 of the room mirror shown in FIG. 21 are displayed during a transition from position 1403 at which the distance from parked vehicle 1405 falls to or below a predetermined value to the parking target position.

When visual recognition ranges 2102 and 2103 are displayed during such a transition, with FIG. 21 taken as an example, the driver can recognize from the display screen of image display section 102 that the boundary of visual recognition range 2102 of the side mirror crosses parked vehicle 2104 and the boundary of visual recognition range 2103 of the room mirror crosses parked vehicle 2105. This allows the driver to recognize that the parked vehicle reflected in the left side mirror in the real world corresponds to parked vehicle 2104 in the left rearward direction of host vehicle 2101 in the display screen and the parked vehicle reflected in the room mirror in the real world corresponds to parked vehicle 2105 in the right rearward direction of host vehicle 2101 in the display screen, thus making it possible to prevent confusion between the real world and the screen display.

Note that when automatic parking is performed by steering wheel turning back as shown in FIG. 15, if the vehicle reaches steering wheel turn-back position 1503 and moves forward, the distance from parked vehicles 1506 and 1507 becomes greater than a predetermined distance when the vehicle moves to rearward-movement start position 1504 after steering wheel turning back.

However, once image display section 102 displays visual recognition range 2102 of the side mirror and visual recognition range 2103 of the room mirror shown in FIG. 21, even if state control section 112 determines later that the distance between the parked vehicles and the host vehicle becomes greater than the predetermined value due to steering wheel turning back, state control section 112 may maintain the current display state. Since the time after moving forward by steering wheel turning back until starting rearward-movement again is assumed to be short, it is possible to prevent frequent transitions in display which would rather make it difficult to understand the display state and the correspondence between the real world and the screen display.

In this control, image display section 102 may be configured to maintain the display of visual recognition range 2102 of the side mirror seen from the driver's seat and visual recognition range 2103 of the room mirror seen from the driver's seat for a predetermined time. Here, when state control section 112 determines that the predetermined time has exceeded, influences by frequent transitions in display are small, and therefore image display section 102 may be switched over to visual recognition range 2102 of the side mirror shown in FIG. 20.

When a predetermined time elapses after the distance from an obstacle detected by distance sensor 101 falls to or below a predetermined value, image display section 102 may make variable the lines extending in the vehicle length direction from both side ends of host vehicle 2101 making up visual recognition range 2103 of the room mirror shown in FIG. 21 according to the steering angle detected by steering angle sensor 104 and display the changed lines as predicted running traces of the host vehicle. This can make both the guidance of the direction to be visually checked and the guidance of fine modification of the orientation of the host vehicle during or after automatic parking. Note that the lines may be made variable according to a movement by a predetermined distance based on wheel speed sensor 105 instead of a lapse of a predetermined time using a timer (not shown).

Thus, Embodiment 2 provides an effect of being able to guide a direction to be visually checked corresponding to the driving state during automatic parking.

The disclosures of Japanese Patent Applications No. 2012-244164, filed on Nov. 6, 2012, and No. 2013-021079, filed on Feb. 6, 2013, including the specifications, drawings and abstracts are incorporated herein by reference in their entireties.

INDUSTRIAL APPLICABILITY

The parking assistance apparatus according to the present invention is suitable for use in assisting parking during parallel parking or double parking.

REFERENCE SIGNS LIST

101 Distance sensor
102 Image display section
103 Vehicle control section
104 Steering angle sensor
105 Wheel speed sensor
106 Gear position sensor
107 User operation button
112 State control section
113 Image creating section
114 Control calculating section

The invention claimed is:
1. A parking assistance apparatus comprising:
a target parking position detection section that detects a target parking position of a vehicle being a parking assistance target;
an angle detection section that detects an angle at which the vehicle approaches the target parking position;

a vehicle speed detection section that detects a vehicle speed of the vehicle;

a current position detection section that detects a current position of the vehicle based on the angle detected by the angle detection section and the vehicle speed detected by the vehicle speed detection section;

a determining section that calculates a plurality of regions corresponding to a rearward-movement start position of the vehicle, each being capable of including an entire region of the vehicle and being wider than a region of the vehicle, based on the target parking position, and that determines, when the entire region of the vehicle reaches any of the plurality of regions, whether or not an angle correction of the current position is necessary with respect to the target parking position; and a display section that displays the target parking position and the plurality of regions, wherein, when the determining section determines, based on the current position, that there is a region unreachable by the vehicle among the plurality of regions, the display section erases the unreachable region from being displayed, wherein the determining section issues an instruction to correct the angle of the rearward-movement start position of the vehicle in the region where the vehicle has reached, when determining that the angle correction of the current position is necessary, the display section displays a first indicating image that indicates an angle correcting direction of the vehicle, when the determining section determines that the angle correction of the current position is necessary, and when the determining section then determines that the angle correction of the current position is not necessary, the display section erases the first indicating image indicating the angle correcting direction of the vehicle and displays a second indicating image indicating a rearward-movement start.

2. The parking assistance apparatus according to claim 1, wherein the determining section calculates an angle range at the rearward-movement start position within which the angle correction of the current position is not necessary with respect to the target parking position, and determines that the angle correction at the current position is necessary, when the angle detected by the angle detection section is outside the calculated angle range.

3. The parking assistance apparatus according to claim 1, wherein the determining section calculates, as the plurality of regions, a first region where parking is possible without steering wheel turning back, a second region where parking is possible with or without steering wheel turning back, and a third region where parking is possible with steering wheel turning back.

4. The parking assistance apparatus according to claim 1, further comprising a display section that displays a movement of the vehicle to detect the target parking position, a movement of the vehicle from the rearward-movement start position and a movement of the vehicle from the rearward-movement start position to the target parking position as bird's-eye view images, wherein the display section displays a detection range of the target parking position detection section during the movement to detect the target parking position, displays a visual recognition range of a side mirror seen from a driver's seat during the movement from the rearward-movement start position, and displays a visual recognition range of the side mirror viewed from the driver's seat and a visual recognition range of a room mirror viewed from the driver's seat during the movement to the target parking position.

5. The parking assistance apparatus according to claim 4, wherein the visual recognition range of the room mirror is a range enclosed by lines extending from both side ends of the vehicle in a vehicle length direction.

6. The parking assistance apparatus according to claim 5, wherein, when a distance from an obstacle detected by the target parking position detection section falls to or below a predetermined distance, the display section switches over to displays of the visual recognition range of the side mirror viewed from the driver's seat and the visual recognition range of the room mirror seen from the driver's seat.

7. The parking assistance apparatus according to claim 6, wherein when the distance from the obstacle detected by the target parking position detection section falls to or below a predetermined distance first, and then the distance becomes greater than the predetermined distance again, the display section maintains displaying the visual recognition range of the side mirror viewed from the driver's seat and the visual recognition range of the room mirror viewed from the driver's seat for a predetermined time.

8. The parking assistance apparatus according to claim 7, wherein after a lapse of a predetermined time after the distance from the obstacle detected by the target parking position detection section falls to or below the predetermined distance, the display section displays lines extending from both side ends of the vehicle and making up the visual recognition range of the room mirror in the vehicle length direction as predicted running traces of the vehicle, the traces being variable according to a steering angle.

9. The parking assistance apparatus according to claim 1, further comprising a distance sensor that measures a distance between the vehicle and an object located in a lateral direction of the vehicle based on reflected waves acquired from the object.

10. The parking assistance apparatus according to claim 9, wherein the target parking position detection section detects the target parking position of the vehicle by receiving the reflected waves and by determining whether a distance between the vehicle and the object is equal to or above a predetermined distance for a predetermined time or longer.

11. The parking assistance apparatus according to claim 1, wherein the region is determined to be unreachable when the vehicle cannot enter the region or when a center of a rear wheel axle of the vehicle cannot enter the region.

* * * * *